(12) United States Patent
Pirnack et al.

(10) Patent No.: US 9,665,878 B2
(45) Date of Patent: May 30, 2017

(54) METHOD AND SYSTEM FOR UPGRADING A PREVIOUSLY PURCHASED MEDIA ASSET

(71) Applicant: Apple Inc., Cupertino, CA (US)

(72) Inventors: Tracy Pirnack, Los Altos, CA (US); Patrice Gautier, San Francisco, CA (US); Debra Ameerally, Sunnyvale, CA (US); Hiro Mitsuji, San Francisco, CA (US); Alan Ward, Boulder, CO (US); George Campbell, Cupertino, CA (US); Darren Ming Lew, Sunnyvale, CA (US); Sam Gharabally, San Francisco, CA (US); Ricardo D. Cortes, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 14/619,664

(22) Filed: Feb. 11, 2015

(65) Prior Publication Data

US 2015/0213475 A1    Jul. 30, 2015

Related U.S. Application Data

(63) Continuation of application No. 12/028,521, filed on Feb. 8, 2008, now Pat. No. 8,984,442, and a (Continued)

(51) Int. Cl.
*G06F 3/048* (2013.01)
*G06Q 30/02* (2012.01)
*G06F 3/0481* (2013.01)

(52) U.S. Cl.
CPC ....... *G06Q 30/0222* (2013.01); *G06F 3/0481* (2013.01)

(58) Field of Classification Search
CPC .................................................... G06F 3/0481
See application file for complete search history.

(56) References Cited

U.S. PATENT DOCUMENTS 6,189,146 B1    2/2001    Misra et al.
6,233,682 B1    5/2001    Fritsch
(Continued)

OTHER PUBLICATIONS

International Preliminary Report on Patentability from PCT Application No. PCT/US2014/018767 dated Sep. 11, 2015.
(Continued)

*Primary Examiner* — Dino Kujundzic
(74) *Attorney, Agent, or Firm* — Polsinelli LLP

(57) ABSTRACT

Systems, graphical user interfaces and methods for upgrading from one or more digital media assets to a set of digital media assets over a network are described. A potential purchaser can be notified of available upgrade opportunities that are available for purchase. The potential purchaser can elect to pursue an upgrade opportunity so as to purchase a set of digital media assets. Upon upgrading to the set of digital media assets, the digital media assets within the set of digital media assets are made available to the purchaser. According to one aspect, a graphical user interface facilitates presenting and requesting upgrade opportunities. According to another aspect, equivalency rules and/or eligibility rules can be used to control which sets of digital media assets are available for upgrade by respective potential purchasers.

20 Claims, 29 Drawing Sheets

Related U.S. Application Data continuation-in-part of application No. 11/685,098, filed on Mar. 12, 2007, which is a continuation-in-part of application No. 11/561,336, filed on Nov. 17, 2006, now abandoned.

(60) Provisional application No. 60/920,377, filed on Mar. 26, 2007.

(56) References Cited

U.S. PATENT DOCUMENTS

| | | | |
|---|---|---|---|
| 6,904,410 B1 | 6/2005 | Weiss et al. | |
| 7,173,177 B1 | 2/2007 | Gould et al. | |
| 7,496,540 B2 | 2/2009 | Irwin et al. | |
| 7,555,466 B2 | 6/2009 | Eglen et al. | |
| 7,657,459 B2 | 2/2010 | Anderson et al. | |
| 7,818,262 B2 | 10/2010 | Kavuri et al. | |
| 7,848,954 B2 | 12/2010 | Posokhow et al. | |
| 7,848,955 B2 | 12/2010 | Leffert et al. | |
| 8,005,761 B1 | 8/2011 | Braumoeller et al. | |
| 8,200,546 B2* | 6/2012 | White | G06Q 10/083 705/26.25 |
| 8,341,513 B1 | 12/2012 | Lattyak et al. | |
| 8,502,056 B2 | 8/2013 | Oppenheimer | |
| 8,984,442 B2 | 3/2015 | Pirnack et al. | |
| 2002/0002538 A1 | 1/2002 | Ling | |
| 2002/0026478 A1 | 2/2002 | Rodgers et al. | |
| 2002/0048369 A1 | 4/2002 | Ginter et al. | |
| 2002/0111907 A1 | 8/2002 | Ling | |
| 2002/0178276 A1 | 11/2002 | McCartney et al. | |
| 2003/0004895 A1 | 1/2003 | Nuttall et al. | |
| 2003/0204449 A1 | 10/2003 | Kotas et al. | |
| 2004/0039916 A1 | 2/2004 | Aldis et al. | |
| 2004/0093396 A1* | 5/2004 | Akune | G06F 21/10 709/219 |
| 2004/0128250 A1 | 7/2004 | Fox et al. | |
| 2004/0149121 A1 | 8/2004 | Ballard | |
| 2004/0215469 A1* | 10/2004 | Fukushima | G06Q 10/02 705/26.1 |
| 2004/0215568 A1* | 10/2004 | Fukushima | G06Q 30/02 705/51 |
| 2004/0268451 A1 | 12/2004 | Robbin et al. | |
| 2005/0119977 A1 | 6/2005 | Raciborski | |
| 2005/0120053 A1 | 6/2005 | Watson | |
| 2005/0160008 A1 | 7/2005 | Spears et al. | |
| 2005/0177386 A1 | 8/2005 | Essa | |
| 2005/0216855 A1 | 9/2005 | Kopra et al. | |
| 2006/0123052 A1 | 6/2006 | Robbin et al. | |
| 2006/0136502 A1 | 6/2006 | Williams et al. | |
| 2006/0190404 A1 | 8/2006 | Stefik et al. | |
| 2006/0248113 A1 | 11/2006 | Leffert et al. | |
| 2006/0248114 A1* | 11/2006 | Anderson | G06Q 30/06 |
| 2006/0254862 A1* | 11/2006 | Hoersten | G06Q 10/06311 186/52 |
| 2007/0073625 A1 | 3/2007 | Shelton | |
| 2007/0215690 A1 | 9/2007 | Shea et al. | |
| 2008/0120199 A1 | 5/2008 | Pirnack et al. | |
| 2008/0147530 A1* | 6/2008 | Kwan | G06F 21/10 705/34 |
| 2008/0215468 A1 | 9/2008 | Monsa-Chermon et al. | |
| 2009/0157553 A1 | 6/2009 | Wang et al. | |
| 2009/0193479 A1 | 7/2009 | Briller et al. | |
| 2010/0070917 A1 | 3/2010 | Gates et al. | |
| 2010/0076778 A1* | 3/2010 | Kondrk | G06Q 30/0241 705/26.1 |
| 2010/0082663 A1 | 4/2010 | Cortes et al. | |
| 2010/0114739 A1 | 5/2010 | Johnston | |
| 2011/0016182 A1 | 1/2011 | Harris | |
| 2011/0138412 A1 | 6/2011 | Roberts et al. | |
| 2011/0153501 A1 | 6/2011 | Agarwal et al. | |
| 2011/0162086 A1 | 6/2011 | Rogel et al. | |
| 2011/0208574 A1 | 8/2011 | Hinojosa, Jr. et al. | |
| 2011/0288945 A1 | 11/2011 | Karhuketo et al. | |
| 2012/0060031 A1 | 3/2012 | Huang et al. | |
| 2012/0124177 A1* | 5/2012 | Sparks | G06Q 20/123 709/219 |
| 2012/0323721 A1 | 12/2012 | Koivuniemi | |
| 2013/0054970 A1 | 2/2013 | Cheng et al. | |
| 2013/0139269 A1 | 5/2013 | Shaikh et al. | |
| 2014/0095341 A1* | 4/2014 | Woods | G06Q 30/06 705/26.5 |

OTHER PUBLICATIONS

Diamond, E.: Album Pre-orders, Web Archives, Apr. 13, 2012, pp. 1-13.

Jennie: Does Amazon Offer a Price Guarantee: Here are the Details You Need to Know, Dec. 9, 2012, Amazon Online Deals, pp. 1-3.

GameStop: Pre-orders, Web Archives, Jun. 18, 2008, p. 1.

"iTunes 11 for Mac: Pre-Order Items from the iTunes Store", Support.apple.com/kb/PH12296, Nov. 30, 2012, 1 page.

"iTunes Store: Complete My Season Frequently Asked Question (FAQ)", Support.apple.com/kb/ht5070#1, Jul. 31, 2012, 2 pages.

Acar, Gündüzhan, "Converting a Digital Media Item From a Rental to a Purchase", International Search Report and Written Opinion, titled Converting a Digital Media Item From a Rental to a Purchase, dated Nov. 1, 2013, 18 pages.

Syed, Farman A. et al., "Media Item Collection Pre-Order Fulfillment", 8802.312.PCT000 ISR and Written Opinion, App. No. PCT/US2014/018767, filed on Feb. 26, 2014, Published on Sep. 4, 2014, dated May 21, 2014, 17 pages.

\* cited by examiner

METHOD AND SYSTEM FOR UPGRADING A PREVIOUSLY PURCHASED MEDIA ASSET

CROSS-REFERENCE TO RELATED APPLICATIONS

This application is a continuation of, and claims the benefit of priority to, U.S. patent application Ser. No. 12/028,521, filed Feb. 8, 2008, entitled "METHOD AND SYSTEM FOR UPGRADING A PREVIOUSLY PURCHASED MEDIA ASSET," which is hereby incorporated herein by reference in its entirety. This application is also a continuation-in-part of U.S. patent application Ser. No. 11/685,098, filed Mar. 12, 2007, entitled "METHOD AND SYSTEM FOR UPGRADING A PREVIOUSLY PURCHASED MEDIA ASSET," which is a continuation-in-part of U.S. patent application Ser. No. 11/561,336, filed Nov. 17, 2006, entitled "METHOD AND SYSTEM FOR UPGRADING A PREVIOUSLY PURCHASED MEDIA ASSET," all of which are incorporated herein by reference in their entirety.

This application also claim priority benefit of U.S. provisional patent application 60/920,377, filed Mar. 26, 2007, and entitled "METHOD AND SYSTEM FOR UPGRADING A PREVIOUSLY PURCHASED MEDIA ASSET," which is hereby incorporated herein by reference.

BACKGROUND OF THE INVENTION

Field of the Invention

The present invention relates to digital media assets and, more particularly, to network-based purchase of sets of digital media assets.

Description of the Related Art

Today, it is common for users to access on-line media repositories to purchase songs or tracks on-line. Recently, on-line media repositories have supported videos, such as movies or television shows. The typical interaction with an on-line media repository is that a user will browse the on-line media repository, select one or more media items to be purchased or otherwise acquired, and then receive electronic delivery of the items over a network. One example of an on-line media repository is an on-line media store, such as the iTunes Music Server® provided by Apple Inc.

Often, a user purchases an individual track or song from an on-line media repository. In many cases the individual track or song will be associated with an album. The album includes a number of different tracks or songs, some or all of which can be purchased individually. For example, a user may purchase one or two songs individually as opposed to purchase of the album. As a result, the user pays a lower cost than the cost of the album but only acquires a portion of the album. The user can thereafter continue to buy other individual tracks or songs from the album to acquire some or all of the remaining tracks or songs of the album. Alternatively, the user could buy the album as a set. However, on buying the album, the user would be charged for the cost of the entire album, even though the user might have previously purchased one or more tracks from the album. As a result, in this conventional scenario, users tend not to purchase albums after they have purchased one or more individual tracks from an album.

An album is a set of media items. The media items are usually tracks of audio recordings (i.e., songs). Upon purchase of an album, conventionally, all of the tracks of the album are downloaded to the user. To the extent that the user has previously purchased certain of the tracks from the album, the user not only pays for some tracks it does not need, but also computing and network resources are wasted when the unneeded tracks are sent and received over the network to the user.

Thus, there is a need for improved approaches to facilitate a user's acquisition of sets of media items.

SUMMARY OF THE INVENTION

The invention pertains to a system, graphical user interface and method for upgrading from one or more digital media assets to a set of digital media assets over a network. A potential purchaser can be notified of available upgrade opportunities that are available for purchase. The potential purchaser can elect to pursue an upgrade opportunity so as to purchase a set of digital media assets. Upon upgrading to the set of digital media assets, the digital media assets within the set of digital media assets are made available to the purchaser.

According to one aspect, a graphical user interface facilitates presenting and requesting upgrade opportunities. According to another aspect, equivalency rules and/or eligibility rules can be used to control which sets of digital media assets are available for upgrade by respective potential purchasers.

In general, the invention can be implemented in numerous ways, including as a method, system, device, apparatus (including graphical user interface), or computer readable medium. Several embodiments of the invention are discussed below.

As a graphical user interface for display on a display device, one embodiment of the invention includes at least a media upgrade window. The media update window can, for example, includes at least (i) a media descriptive portion providing information concerning a media bundle available from an on-line media store, and (ii) a media item listing area providing a listing of a plurality of media items within the media bundle. Further, a portion of the media items in the listing can be visually distinguished from other of the media items in the media item listing, where the portion of the media items being visually distinguished are those of the media items within the media bundle that have been previously acquired.

As a graphical user interface for display on a display device associated with a computing device for a user, one embodiment said graphical user interface includes at least an upgrade availability window for presenting information for a plurality of media asset bundles that are available for purchase by the user, the media asset bundles that are available to the user are those media asset bundles for which the user previously acquired at least one media asset within each of the media asset bundles.

As a computer-implemented method for facilitating upgrade to a media bundle, one embodiment of the invention includes at least the acts of: identifying a previously purchased media item; identifying an initial media bundle that is associated with the previously purchased media item; determining one or more media bundles that are equivalent to or related to the initial media bundle based on one or more equivalency rules; and causing an upgrade opportunity regarding at least one of the one or more media bundles that are equivalent to or related to the initial media bundle to be presented.

As a computer-implemented method for facilitating upgrade to a media bundle, one embodiment of the invention includes at least the acts of: identifying a previously purchased media item; and determining a media bundle associated with the previously purchased media item. For example, determination of the media bundle associated with the previously purchased media item can be a media bundle in which the previously purchased media item is one of, or equivalent to one of, the media items within the media bundle.

As a computer readable medium including at least executable computer program code tangibly stored thereon for facilitating upgrade to a media bundle, one embodiment of the invention includes at least: computer program code for identifying a previously acquired media item; computer program code for identifying an initial media bundle that was associated with the previously acquired media item at the time at which the previously purchased media item was acquired from an on-line media store; computer program code for determining one or more media bundles that are equivalent to or related to the initial media bundle based on one or more equivalency rules; and computer program code for causing an upgrade opportunity regarding at least one of the one or more media bundles that are equivalent to or related to the initial media bundle to be presented.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to a system, graphical user interface and method for upgrading from one or more digital media assets to a set of digital media assets over a network. A potential purchaser can be notified of available upgrade opportunities that are available for purchase. The potential purchaser can elect to pursue an upgrade opportunity so as to purchase a set of digital media assets. Upon upgrading to the set of digital media assets, the digital media assets within the set of digital media assets are made available to the purchaser.

According to one aspect, a graphical user interface facilitates presenting and requesting upgrade opportunities. According to another aspect, equivalency rules and/or eligibility rules can be used to control which sets of digital media assets are available for upgrade by respective potential purchasers.

In one embodiment, an on-line media store makes sets of digital media assets available. A potential purchaser can access the on-line media store over a network connection (wired or wireless) and then browse, search and/or purchase sets of digital media assets. One type of purchase is an upgrade purchase. With an upgrade purchase, the cost for the upgrade is typically less than the cost of purchasing the set of digital media assets without upgrading. The purchased digital media assets can be electronically delivered, such as from the on-line media store.

The digital media assets can be audio, graphic, video, or some combination thereof. A set of digital media items is a group of digital media assets. A set of digital media assets can, for example, pertain to a group, collection, playlist, or bundle of digital media assets. As examples, a set of digital media assets can pertain to an album (i.e., a set of songs), a television series or season (i.e., a set of television shows/episodes), a photo album (i.e., a set of photos or images), a video album (i.e., a set of videos) (e.g., movies or music videos), or a set of podcasts (i.e., a set of podcast episodes). A set of digital media assets can also include or be supplemented by text or multimedia files.

Embodiments of the invention are discussed below with reference to FIGS. 1-21. However, those skilled in the art will readily appreciate that the detailed description given herein with respect to these figures is for explanatory purposes as the invention extends beyond these limited embodiments.

Figure 1:
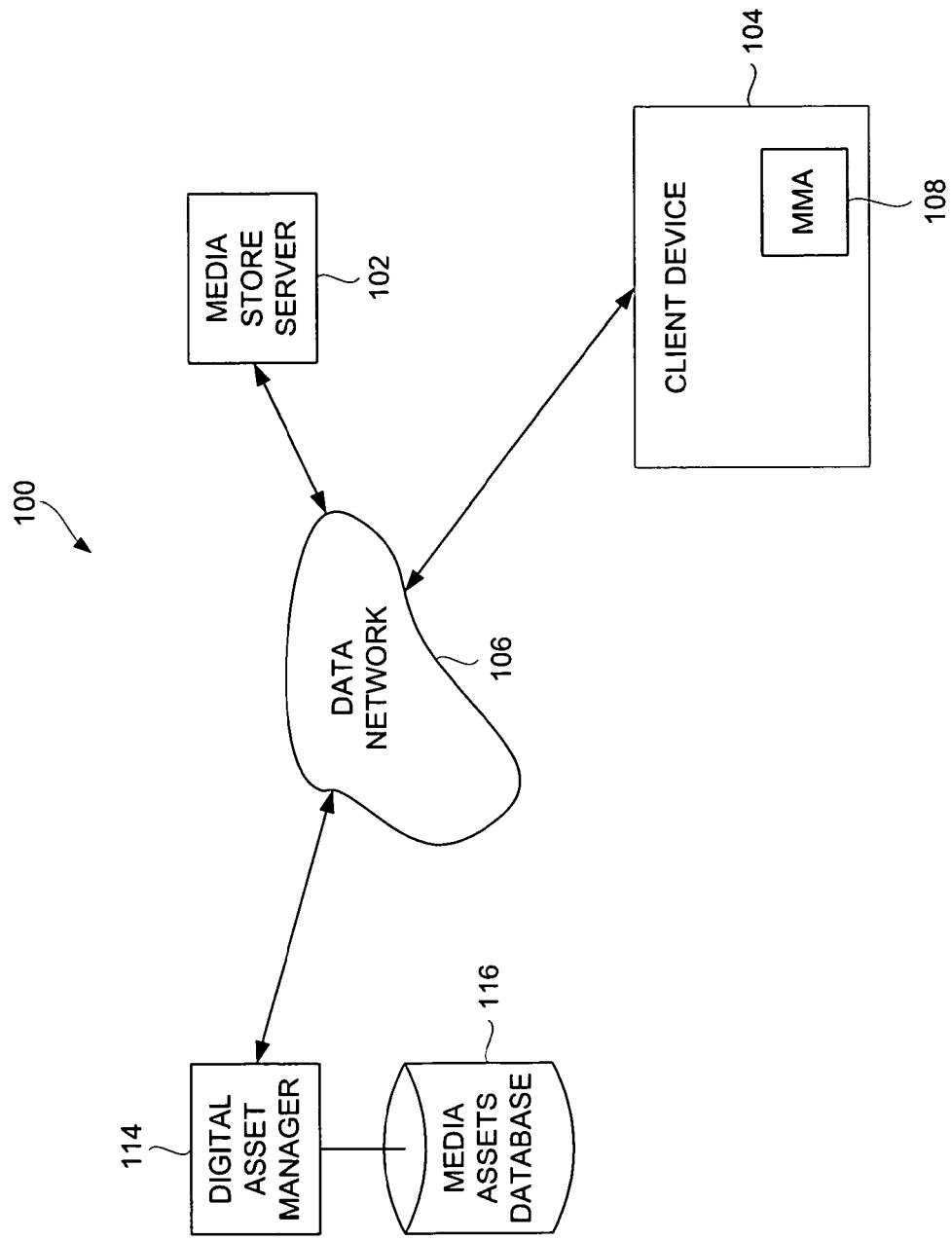
FIG. 1 is a block diagram of a media purchase system according to one embodiment of the invention.

FIG. 1 is a block diagram of a media purchase system 100 according to one embodiment of the invention. The media purchase system 100 includes a media store server 102 that hosts an on-line media store. The media store server 102 can off-load commerce transactions and/or delivery of purchased digital media assets to other servers, if desired. As shown in FIG. 1, the media purchase system 100 includes one or more client devices 104 for use by end users. The client devices 104 couple to a data network 106. Additionally, the media store server 102 also couples to the data network 106. In one implementation, the data network 106 can refer to one or more data networks, typically, high data-bandwidth networks, namely, wired networks, such as the Internet, Ethernet, gigabit Ethernet, and fiber optic, as well as wireless networks such as IEEE 802.11(a),(b) or (g) (WiFi), IEEE 802.16 (WiMax), and Ultra-Wide Band (UWB).

A computer program 108, typically a media management application (MMA) or other media player application, runs on the client device 104. One example of a media management application is the iTunes® application, produced by Apple Inc. of Cupertino, Calif. The client devices 104 are, in general, computing devices. As an example, the client devices 104 can be specific or general-purpose personal computers or portable media players. The computer program 108 can be used by a consumer for a variety of purposes, including, but not limited to: (i) browsing and/or purchasing media assets (including sets of media assets) from the on-line media store provided by the media store server 102, (ii) creating and sharing media asset groups (e.g., playlists), (iii) organizing media assets, (iv) presenting/playing media assets, and/or (v) transferring media assets between client devices 104. In an alternative embodiment, the computer program 108 can be a network browser application (e.g., web browser).

The media purchase system 100 can also include a digital asset manager 114. The digital asset manager 114 is coupled to a media assets database 116. The media assets database 116 stores media asset information including metadata relating to digital media assets available for purchase at the on-line media store. In one embodiment, the digital asset manager 114 can control what media assets and media asset information are available on the on-line media store. The metadata can pertain to individual media assets (digital media assets) or media asset groups (digital media asset groups). One type of group of digital media assets is an album, such as an audio album or a video album. Another type of group of digital media assets is a season or a series of media assets (e.g., television series or movie sequels). The digital assets within a media asset group can include video, music, text, and/or graphics files.

The media store server 102 enables the user of a particular client device 104 to purchase a set (e.g., group or collection) of media assets through on-line transactions. One specific example of a set of media assets that can be purchased is an upgrade transaction. On-line transactions to purchase media items are also referred to as electronic commerce (e-commerce). Subsequently, the client device 104 can download the purchased media assets from the media store server 102, or some other server, such as the digital asset manager 114, via the data network 106. As will be understood by those familiar with data networks, other network configurations are possible. Furthermore, while the media store server 102 and the digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Figure 2:
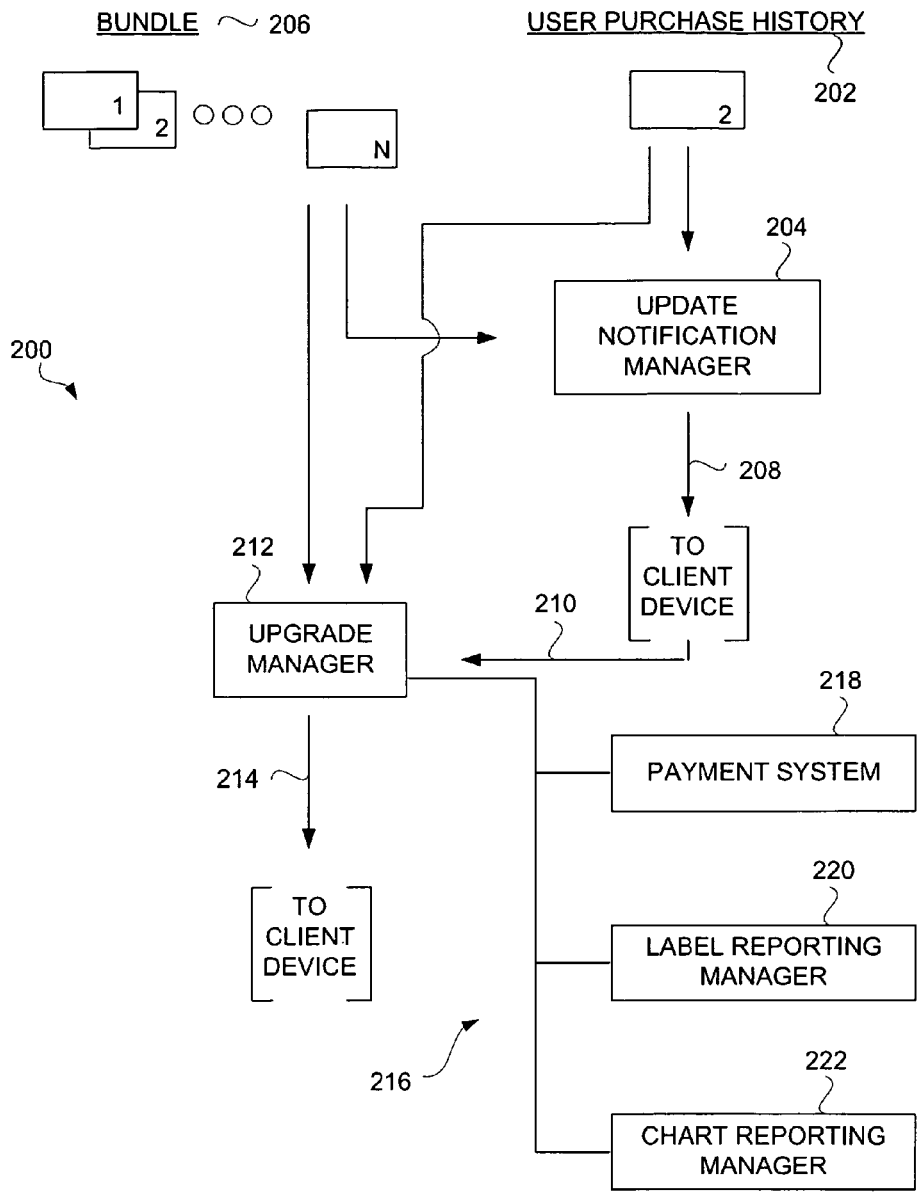
FIG. 2 is a diagram of an upgrade system according to one embodiment of the invention.

FIG. 2 is a diagram of an upgrade system 200 according to one embodiment of the invention. The upgrade system 200 can, for example, be performed by a server (server computer). For example, the server can correspond to the media store server 102 or the digital media manager 114 illustrated in FIG. 1.

The upgrade system 200 facilitates users in upgrading from individual media items to bundles of media items. According to the upgrade system 200, a user purchase history 202 can identify one or more media items previously purchased by a user. An upgrade notification manager 204 can make use of the user purchase history 202 as well as information concerning available bundles 206 of media items that are available from the upgrade system 200. The upgrade notification manager 204 can operate to send notifications 208 to one or more client devices. The notifications remind, encourage or entice users to upgrade to bundles of media items.

A user, in response to the notification message or otherwise, can send a request 210 to update from one or more media items to a bundle of media items. The upgrade request 210 is provided to an upgrade manager 212. The upgrade manager 212 manages processing associated with upgrading the user from their prior purchase of one or more media items from the bundle to their purchase of the entire bundle. The upgrade manager 212 can make use of the user purchase history 202 and information concerning the bundles 206. Using this information, the upgrade manager 212 can determine those media items from the bundle 206 that need to be delivered to the client device. The determined media items can then be sent 214 to the client device. In one embodiment, only those media items within the bundle that the user does not already have (from prior purchases) are sent to the client device associated with the user. In another embodiment, the entire bundle 206 could be delivered 214 to the user via the client device. The upgrade manager 212 can further interact with other subsystems 216. The subsystems 216 can include a payment system 218, a label reporting manager 220 and a chart reporting manager 222.

In one embodiment, the items in the bundles are associated with media, such as songs, videos, television programs, podcasts and other media. Typically, media items of such media are available individually or as a bundle. With media of this nature, in many cases, the copyright owners and/or the media industry require reporting purchases for royalties, charting, or other purposes. The label reporting manager 220 can operate to report to a label that prior user purchases have been refunded and that a bundle has instead been purchased. The chart reporting manager 222 can inform a charting organization that a bundle has been purchased and that prior user purchases have been returned or refunded.

The payment system 218 can process payment for the upgrade to a bundle. The payment can be dependent upon the portion of the bundle that the user has already purchased.

The payment can be processed as an upgrade cost. Alternatively, the payment can be processed in two steps, namely, (i) a refund of prior purchases and (ii) a purchase of the entire bundle. Typically, the bundle has a cost and the upgrade cost is less than the bundle cost given that the user has some portion of the bundle already. The payment system 218 can also handle royalty payments to a label or other entity/person. The royalty payment can be processed as an upgrade royalty. Alternatively, the royalty payment can be processed in two steps, namely, (i) a royalty refund of royalty previously paid for prior purchases and (ii) a royalty payment for purchase of the entire bundle.

Figure 3:
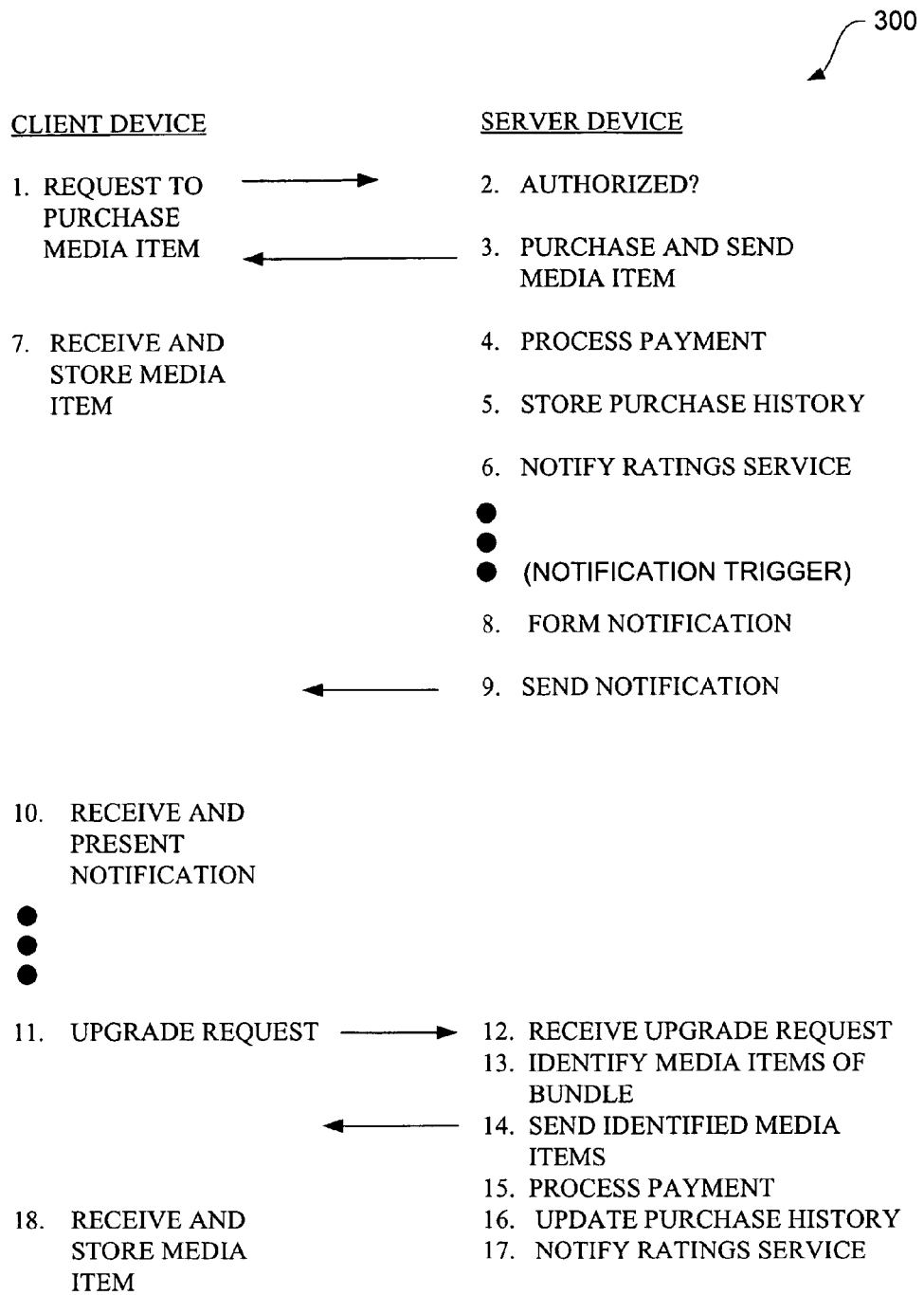
FIG. 3 is a diagram illustrating a client-server upgrade arrangement according to one embodiment of the invention.

FIG. 3 is a diagram illustrating a client-server upgrade arrangement 300 according to one embodiment of the invention. The client-server upgrade arrangement 300 illustrates processing performed at a client device as well as processing performed at a server device. The sequence of steps illustrated in FIG. 3 that are performed between the client device and the server device only represent one embodiment of the invention. Hence, it should be recognized that other processing sequences can be utilized.

In FIG. 3, initially, at the client device, a request to purchase a media item is sent to a server device (step 1). The server device then determines whether the user is authorized to make the requested purchase (step 2). Assuming that the user is authorized, the media item that has been requested is purchased and then sent to the client device (step 3). Hence, the server device processes payment for the media item (step 4) and stores information concerning the purchase as purchase history (step 5). The server device can also notify a ratings service (or charting service) (step 6). At the client device, the media item is received and stored (step 7). At this point, the media item is available for use at the client device.

At the server device, subsequent to the purchase and delivery (and other associated processing) for a media item, a notification trigger can occur. The notification trigger is a trigger for the server device to evaluate which users should receive notifications concerning upgrade opportunities. In this regard, a notification is formed (step 8) and then sent to the client device (step 9). The client device that receives the notification is able to present the notification (step 10). The notification can be presented in a variety of different ways depending upon implementation and type of notification being provided by the server device. In any case, sometime after being presented with the notification, the client device can issue an upgrade request to the server device (step 11). When the server device receives the upgrade request (step 12), the server device can identify the bundle associated with the upgrade request (step 13). Then, those missing media items for the bundle are sent to the client device (step 14). The server device can further perform financial transactions to process payment for the purchase of the bundle and/or for royalty payments (step 15). Still further, the purchase history associated with the user can be updated at the server device (step 16). Further still, a ratings (or charting) service can be notified that the user has upgraded from the one or more individual purchases to the entire bundle (step 17).

After the media items needed to complete the bundle are sent from the server device to the client device, the client device receives and stores the media items (step 18). At this point, the client device stores the entire bundle, namely, the client device stores each of the media items within the bundle. Thereafter, the client device is able to play or further transmit any of the media items associated with the bundle.

Payment processing can be implemented in one or more transactions. At step 4 of the client-server upgrade arrangement 300, according to one example, a first transaction can be a financial transaction to pay the cost of the media item being purchased. Also, if a royalty payment is required, step 4 can include a second transaction which can be a financial transaction to pay a royalty associated with the purchase of the media item.

At step 15 of the client-server upgrade arrangement 300, according to a first example, the server device can perform a first financial transaction to refund prior payment for any individual media items within the bundle that the user already has purchased, and a second financial transaction to process payment for the cost of the bundle. Alternatively, at step 15, according to a second example, the server can perform a financial transaction to process payment for the upgrade cost of the bundle. Beyond the payments for the media, when royalty payments are required, step 15 can further include process of any required royalty payments. Here, the royalty payments can be in a single or multiple transactions. In one example, as a single transaction, the royalty payment can be processed as the appropriate royalty for the upgrade. In another example, as multiple transactions, the royalty payment can be processed as a first financial transaction to pay a royalty due for the bundle (i.e., an entire bundle) and a second financial transaction to acquire a refund of any previously paid royalty associated with earlier purchase of individual media items within the bundle.

In order to determine which users or client devices should receive upgrade notifications, the system needs to determine which users have purchased individual media items that are associated with media bundles that can be upgraded. Such users can be denoted as being eligible for an upgrade from individual media items to media bundles.

Figure 4:
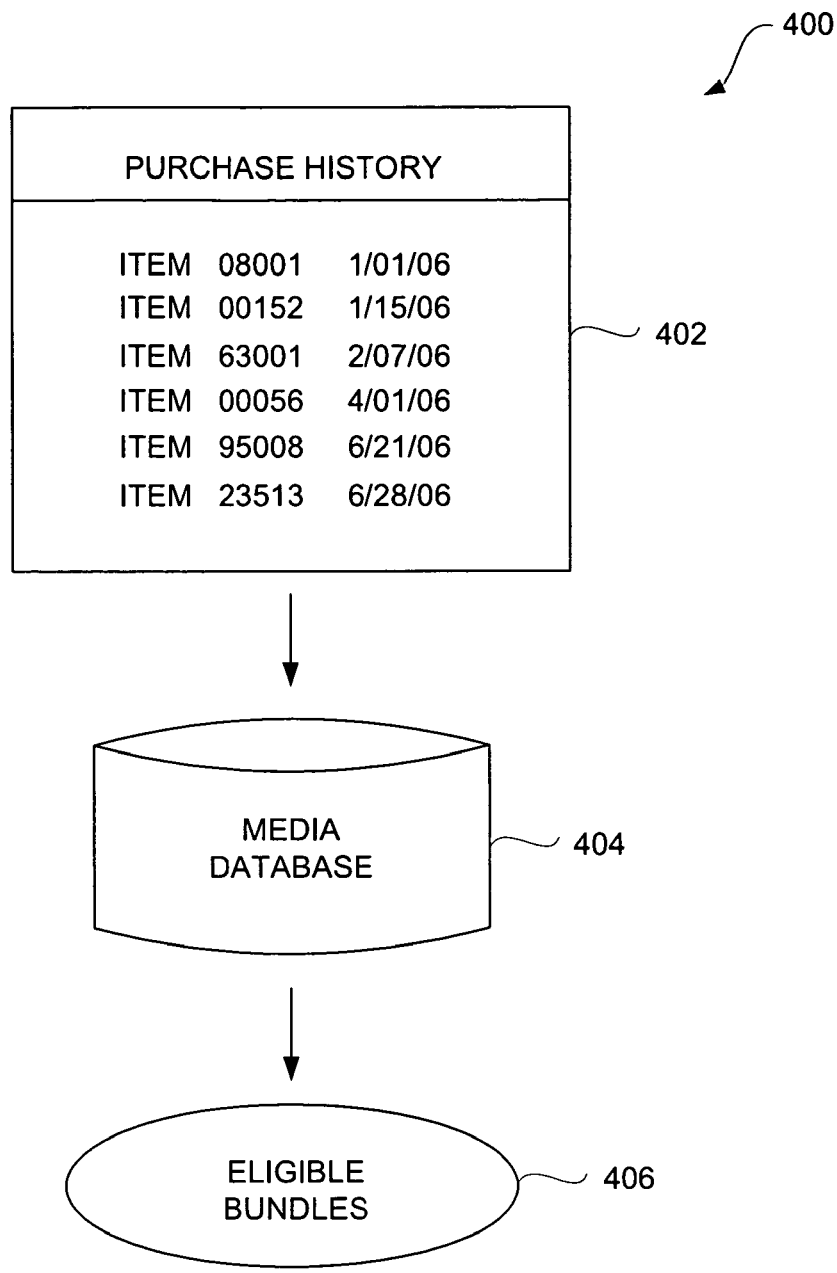
FIG. 4 illustrates a diagram of an upgrade eligibility system according to one embodiment of the invention.

FIG. 4 illustrates a diagram of an upgrade eligibility system 400 according to one embodiment of the invention. The upgrade eligibility system 400 can, for example, be utilized by the upgrade notification manager 204 illustrated in FIG. 2. The upgrade eligibility system 400 utilizes purchase information 402. The purchase information 402 can pertain to the user purchase history 202 illustrated in FIG. 2. The upgrade eligibility system 400 analyzes each item previously (and recently) purchased by a user. Typically, the purchase history will identify the item by a unique identifier as well as a date of purchase. Using the date of purchase, the upgrade eligibility system 400 can restrict upgrade opportunities to those media items that have been more recently purchased. For example, only those media items purchased within a predetermined number of days (e.g., 180 days) could be eligible for upgrade. In the example illustrated in FIG. 4, the purchase history contains six media items that were purchased on different days. If the upgrade eligibility system 400 only permits user purchases within the last six months (e.g., 180 days) to be upgraded, and the current date is Aug. 1, 2006, then only four of the previously purchased items are eligible to be considered for upgrade. Also, in one implementation, the upgrade eligibility system 400 can limit upgrade eligibility to situations which satisfy expiration criteria. For example, the expiration criteria can be based on a user's first purchase of a media asset that is associated with the media bundle. In such an example, an upgrade opportunity has its eligible duration based on the date of purchase of the first media asset and would not be later re-eligible on subsequent purchase of other media assets associated with the media asset bundle. Those of the media items that are eligible for upgrade can be provided to a media database 404. The media database 404 can determine which of those eligible media items is available to be upgraded. In particular, a particular media item can be associated with a particular bundle. For example, the unique identifier for a previously purchased media item can be associated with a bundle via the media database 404. The media database 404 can provide information linking the particular media item to an associated media bundle as well as information indicating whether the media bundle is available for upgrade. When a media bundle is available for upgrade, the media bundle can be permitted to be transacted as part of an upgrade from a prior purchase. Assuming that the associated media bundle is eligible for upgrade, the upgrade eligibility system 400 then identifies eligible bundles 406. Thereafter, the user associated with the purchase history 402 can be notified that the eligible bundles 406 are made available to them should they wish to upgrade. The user can then request to upgrade to one or more of the eligible bundles 406.

The eligible bundles 406 can pertain to one or multiple types of digital media assets. As one example, if a previously purchased media item is an audio track (e.g., song), then the eligible bundle 406 can be an album (music album). As another example, if a previously purchased media item is a television show episode, then the eligible bundle 406 can be a series or set of episodes of a show or event. Television shows are typically daily or weekly programs. As such, a set or season of a television show includes a number of different episodes that are broadcast over the course of the season. As still another example, if a previously purchased media item is a video track (e.g., song), then the eligible bundle 406 can be a video album.

A media season can include all episodes of a show (e.g., television show) or event (e.g., sporting event) corresponding to a particular media season. A media season can consist of a predetermined number of consecutive episodes of a show or event. For example, the media season being purchased can be defined as forward looking, meaning that only a current episode and future episodes are contained in the media season for the registered user. Consequently, different registered users can get a different set of episodes depending on when they purchase the media season. A media season can include episodes containing audiovisual content regarding highlights of one or more events, shows, or programs. For example, the media season can be audiovisual highlights for a particular sporting event.

Figure 5:
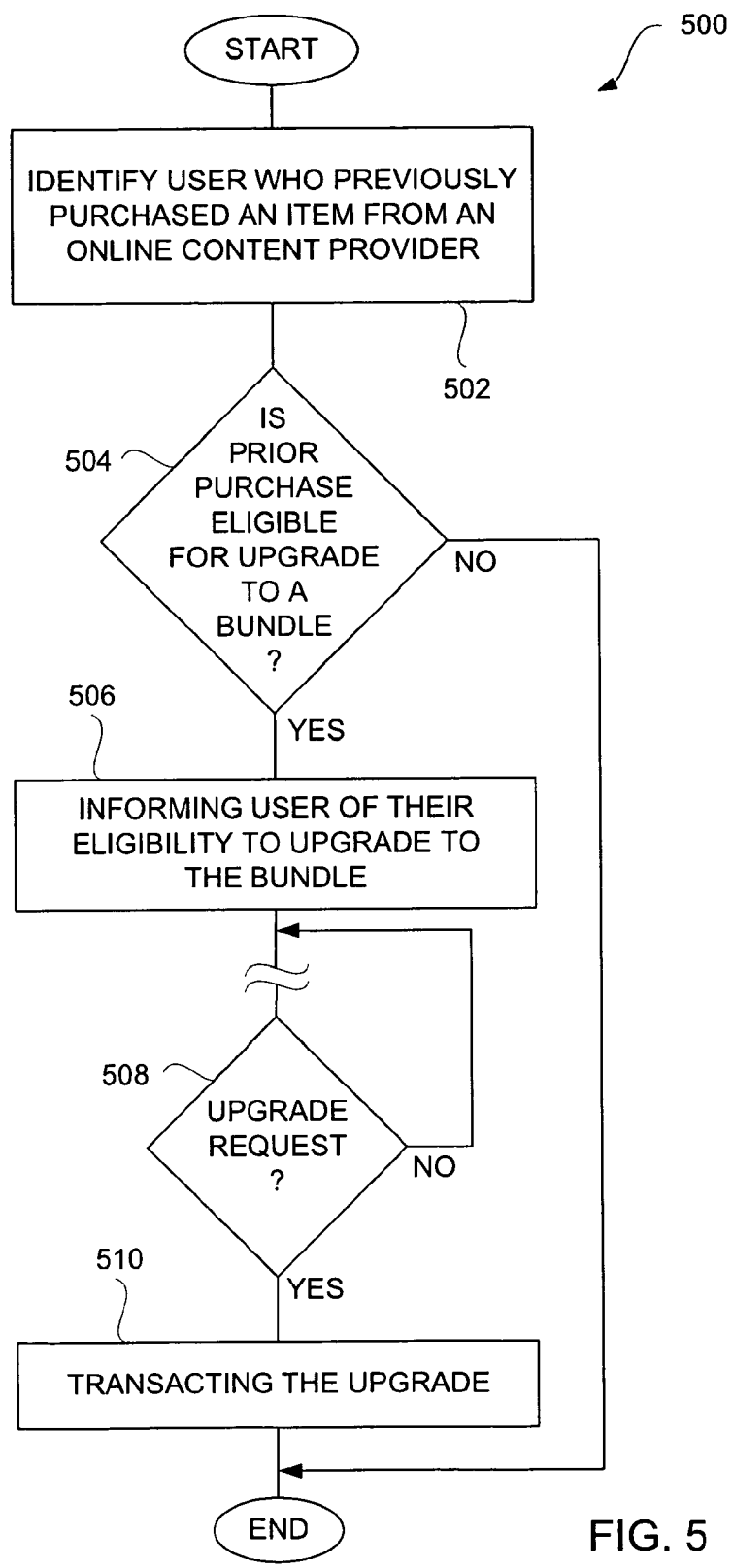
FIG. 5 is a flow diagram of an upgrade process according to one embodiment of the invention.

FIG. 5 is a flow diagram of an upgrade process 500 according to one embodiment of the invention. The upgrade process 500 is performed by a server (server computer). For example, the server can correspond to the media store server 102 or the digital media manager 114 illustrated in FIG. 1.

The upgrade process 500 initially identifies 502 a user who has previously purchased an item from an on-line content provider. In one embodiment, the on-line content provider can store purchase history information for its users. The server can then subsequently analyze the purchase history to determine those users that have previously purchased items from the on-line content provider.

Next, a decision 504 determines whether there are any prior purchases that are eligible for upgrade to a corresponding bundle. When the decision 504 determines that the prior purchases of the user are not eligible for upgrade to one or more bundles, then the upgrade process 500 ends. On the other hand, when the decision 504 determines that one or more prior purchases of the user are eligible for upgrade to a corresponding bundle, the user can be informed 506 of their eligibility to upgrade to the corresponding bundle. In another implementation, the user can be informed 506 by way of an upgrade notification message. The upgrade notification message can be an electronic mail message that is electronically sent to the user. In one implementation, the electronic mail message can include a hyperlink to a web page (or network address) where the corresponding bundle is described and where upgrade to the bundle can be initiated via user interaction with the web page. In another embodiment, the user can be informed 506 of their eligibility to upgrade to one or more bundles when they login to an on-line content provider or as they utilize a media store hosted by an on-line content provider.

In any case, after the user has been informed 506 of their eligibility to upgrade to one or more bundles, a decision 508 can be performed. The decision 508 can be performed immediately after the informing 506 or some time thereafter depending upon the type of notification and the time in which the user decides to upgrade to one or more bundles. Hence, the decision 508 determines whether an upgrade request has been received. Typically, the upgrade request would be initiated by the user when the user desires to upgrade to a particular bundle. When the decision 508 determines that an upgrade request has not been received, then the upgrade process 500 effectively awaits the upgrade request. In the interim, other processing can be performed by the server. Once the decision 508 determines that an upgrade request has been received, the upgrade can be transacted 510. The transaction for the upgrade can include providing the additional content (e.g., digital media content) associated with the upgrade to the user. In addition, the transacting 510 can also include one or more of payment processing, label or chart processing, or other service reporting. Following the block 510, the upgrade process 500 ends.

Figure 6:
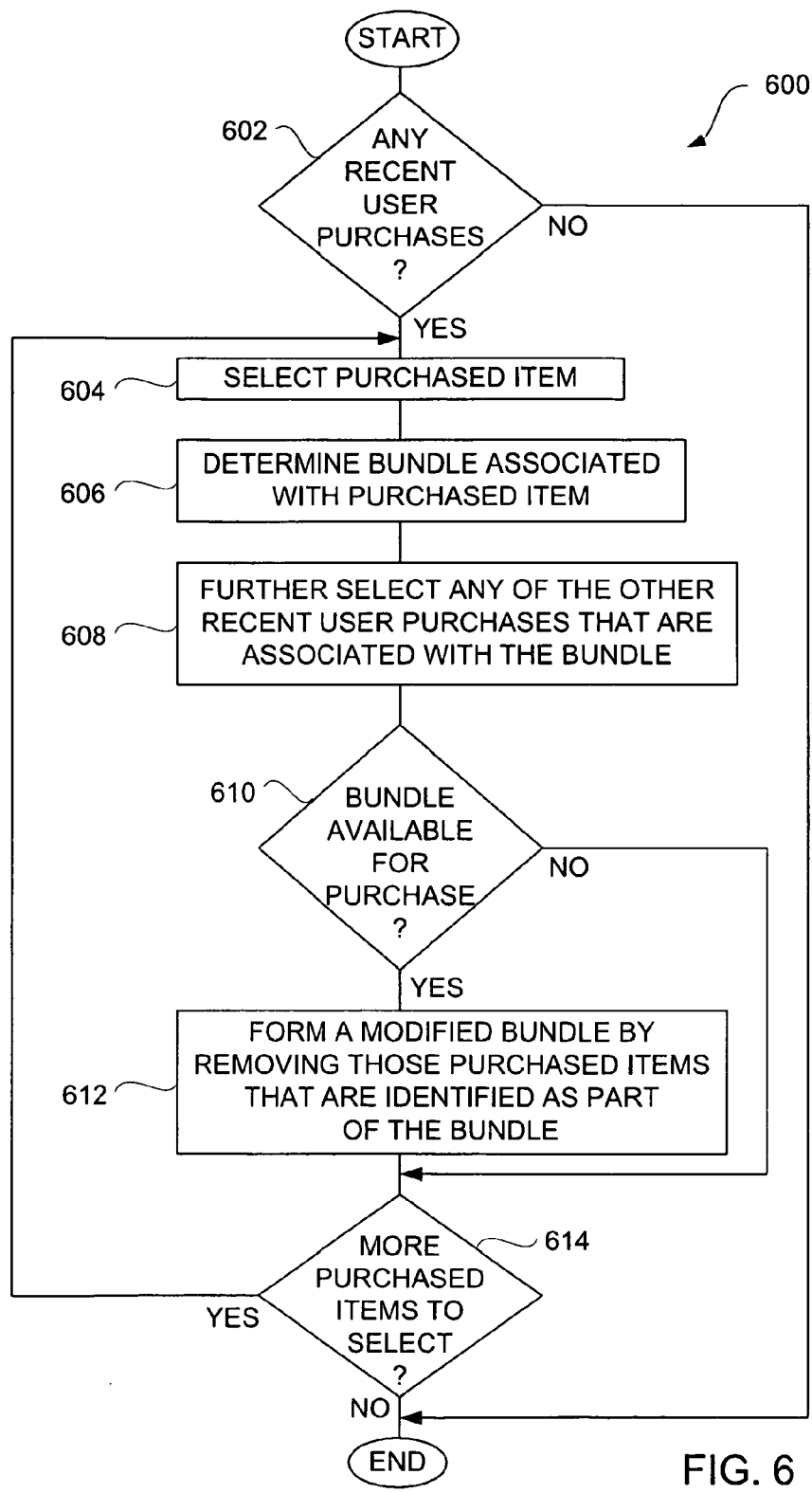
FIG. 6 is a flow diagram of an upgrade eligibility process according to one embodiment of the invention.

FIG. 6 is a flow diagram of an upgrade eligibility process 600 according to one embodiment of the invention. The upgrade eligibility process 600 is, for example, performed by the decision 504 to determine whether prior purchases of a particular user are eligible for upgrade to associated bundles.

The upgrade eligibility process 600 begins with a decision 602. The decision 602 determines whether there are any recent user purchases. Here, the prior purchases that are eligible for upgrade can be limited to those user purchases that have been recently performed. As an example, a recent purchase can be considered any purchase with an on-line content provider that has been transacted within the last 180 days. As another example, the recent user purchase can be any purchase with an on-line content provider within the last six months or within the same calendar year. More generally, the decision 602 can utilize a business rule in determining which prior purchases are available for upgrade.

When the decision 602 determines that there are no recent user purchases, the upgrade eligibility process 600 ends without having any upgrade opportunities for the user. Alternatively, when the decision 602 determines that there are recent user purchases, a purchase item is selected 604. The bundle associated with the purchased item is then determined 606. Next, any of the other recent user purchases that are associated with the bundle are further selected 608. For example, if the bundle concerns an album of music, and the user has recently purchased tracks (i.e., songs) 1 and 3 of the ten (10) track album, then the track 1 being the selected purchased item and the track 3 being the other recent user purchase that are associated with the same album can be consolidated into one upgrade opportunity.

A decision 610 then determines whether the bundle is available for purchase in the upgrade context. There may be some limitations on the extent to which a bundle is available for purchase. As an example, the bundle upgrade may be prohibited from being utilized in an upgrade fashion. As another example, the bundle may be permitted only in certain situations, such as if only one item from the bundle has been previously purchased. As still another example, if most of the media items in the bundle have been previously purchased, the bundle upgrade may not be permitted. For example, the upgrade cost to complete the bundle can be restricted to those upgrade opportunities that have a minimum cost. In any event, when the decision 610 determines that the bundle is available for purchase, a modified bundle is formed 612 by removing those previously purchased items that are identified as part of the bundle.

Following the block 612 or following the decision 610 when the bundle is not available for purchase, a decision 614 determines whether there are more purchased items to be selected. Here, the decision 614 determines whether there are other recent user purchases that have not yet been processed. When the decision 614 determines that there are more recent user purchases to be considered, the upgrade eligibility process 600 returns to the block 604 so that another recently purchased item can be selected and similarly processed. On the other hand, when the decision 614 determines that there are no more purchased items to be selected, the upgrade eligibility process 600 ends.

In one embodiment, the decision 602 and/or the decision 610 can cause a bundle to be eligible for upgrade by a given user only once. The upgrade opportunity can remain available to the user until the upgrade opportunity expires. In one implementation, the upgrade opportunity expires based on the date of the first user purchase of a media item that is associated with the bundle.

Although the upgrade eligibility process 600 is described with regard to recent user purchases, it should be understood that the in an alternative embodiment prior purchases can be eligible for upgrade even though not recently purchased. For example, any prior purchase with an on-line content provider could be eligible.

Figure 7A:
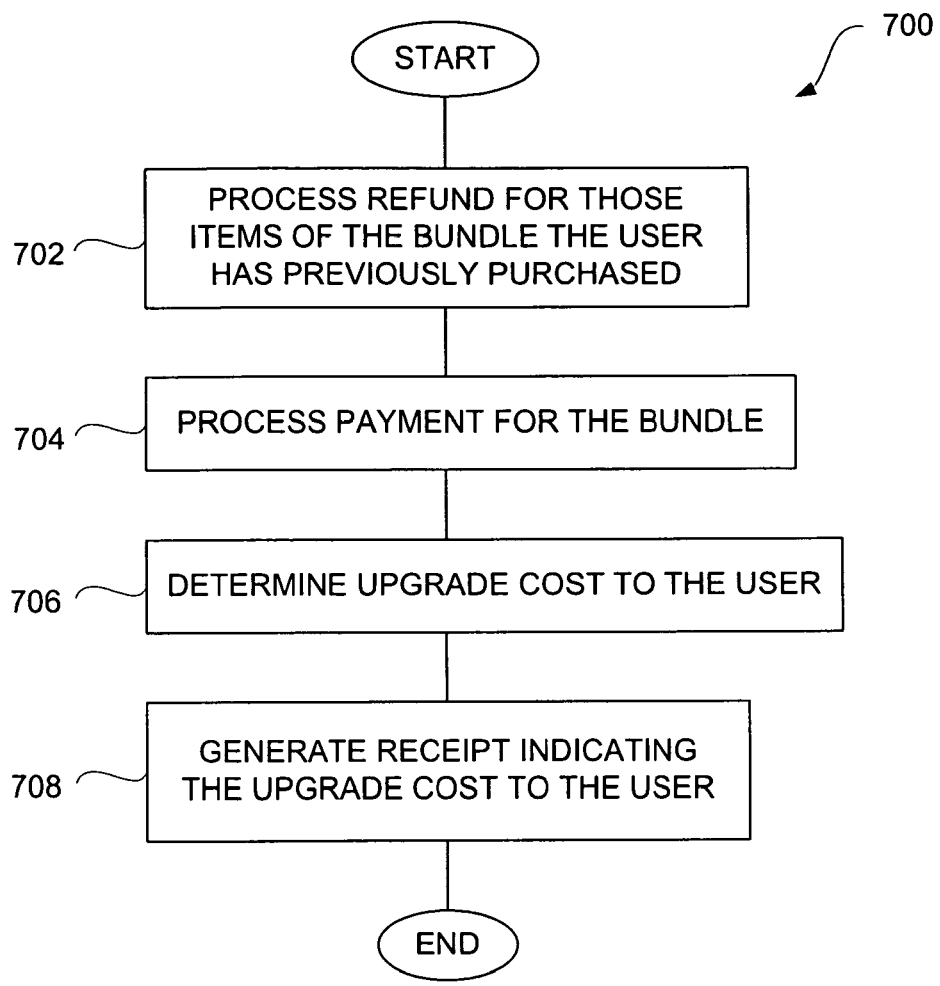
FIG. 7A is a flow diagram of a payment process according to one embodiment of the invention.

FIG. 7A is a flow diagram of a payment process 700 according to one embodiment of the invention. The payment process 700 can represent at least a portion of the processing associated with the block 510 illustrated in FIG. 5. The payment process 700 initially processes 702 a refund for those items of the bundle the user has previously purchased. For example, if the user previously purchased two items from the bundle at one (1) dollar each, the refund process would refund two (2) dollars to the user. Next, the payment for the bundle is processed 704. Here, in one embodiment, the bundle has a predetermined price which is the cost for purchase of the bundle. Hence, payment of the predetermined price for the bundle can be processed 704. For example, the bundle could be available at a cost of ten (10) dollars. Hence, payment for the bundle would be processing the ten (10) dollar payment. Next, an upgrade cost for the user can be determined 706. Here, the upgrade cost to the user is, according to one embodiment, the difference in the cost of the bundle less the cost of the items of the bundle previously purchased. In the example provided above, the cost of the bundle is ten (10) dollars and the cost of the previously purchased items is a total of two (2) dollars. Hence, the upgrade cost to the user for upgrading to the bundle would be ten (10) dollars minus two (2) dollars which equals eight (8) dollars. In addition, a receipt indicating the upgrade cost to the user can be generated 708. Here, in this embodiment, the user is provided a receipt indicating the particular upgrade cost that has been effectively charged to the user for the upgrade. However, the payment system, in this embodiment, processes the transaction as a refund of the prior purchase(s) together with a payment for the bundle, which is two transactions. The net result is that the user is charged the upgrade cost and thus such amount appears on the receipt.

Figure 7B:
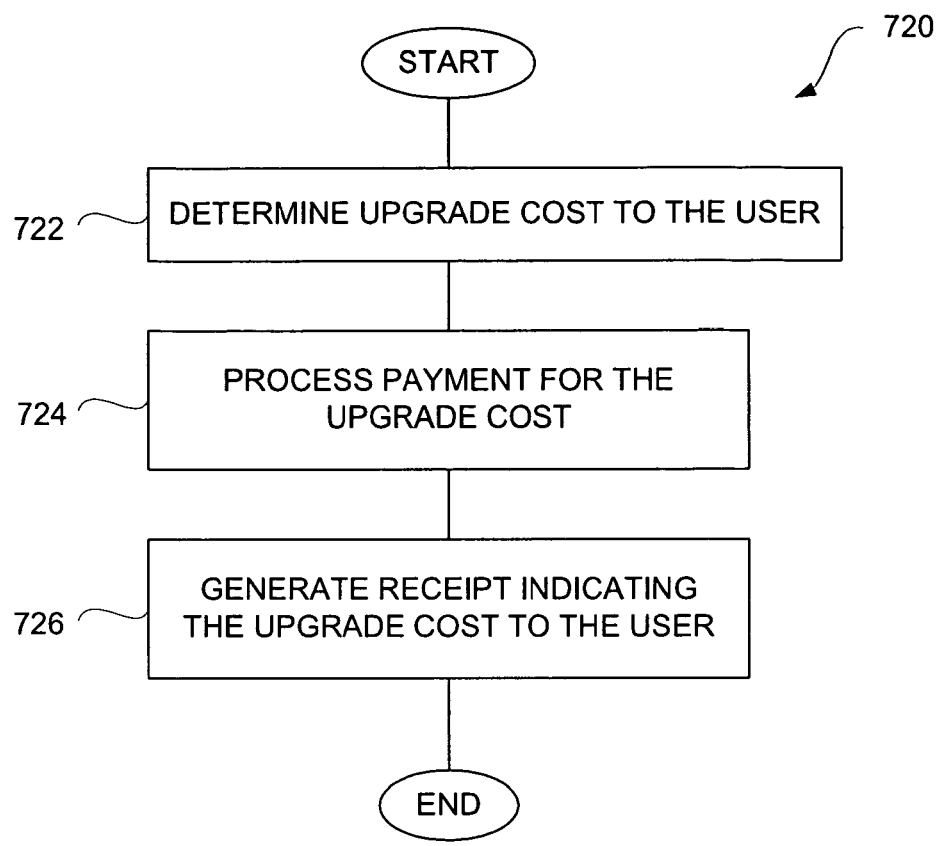
FIG. 7B is a flow diagram of a payment process according to another embodiment of the invention.

FIG. 7B is a flow diagram of a payment process 720 according to another embodiment of the invention. The payment process 720 can represent at least a portion of the processing associated with the block 510 illustrated in FIG. 5. The payment process 720 determines 722 an upgrade cost for the user. Here, the upgrade cost to the user is, according to one embodiment, the difference in the cost of the bundle less the cost of the items of the bundle previously purchased. Next, the payment for the upgrade cost for the bundle can be processed 724. In addition, a receipt indicating the upgrade cost to the user can be generated 726.

Figure 7C:
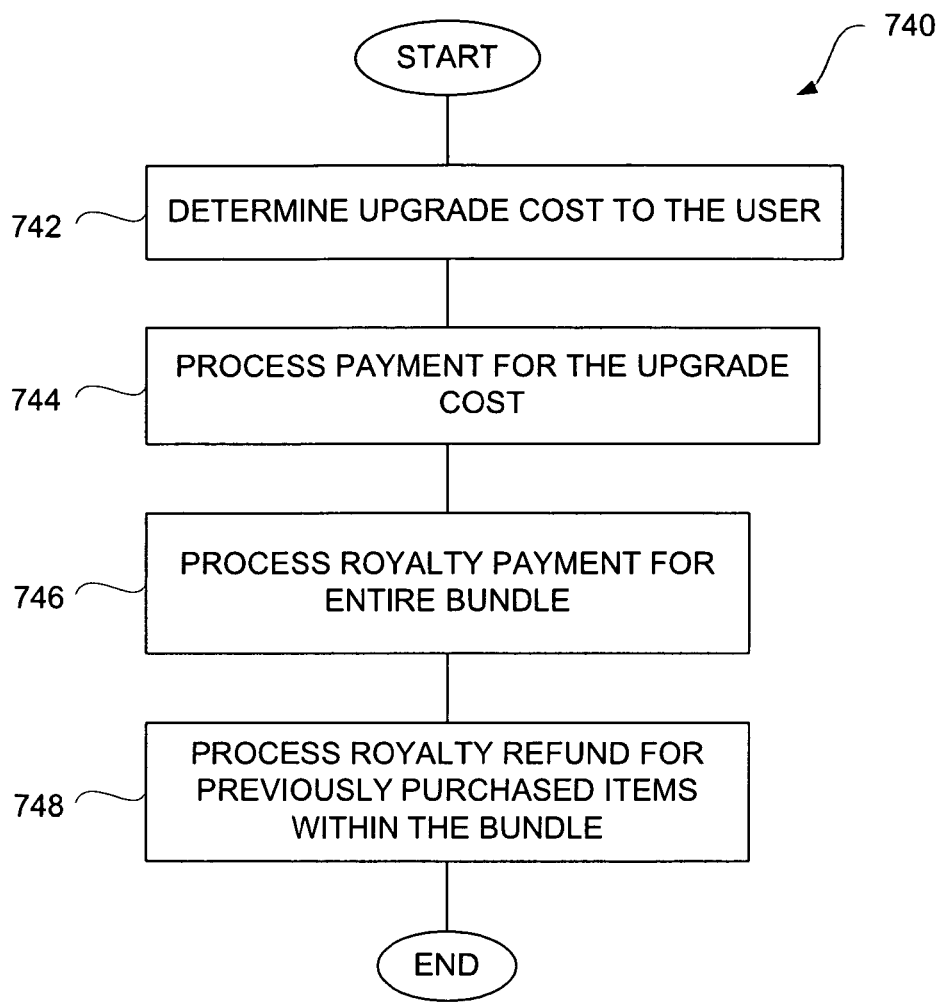
FIG. 7C is a flow diagram of a payment process according to another embodiment of the invention.

FIG. 7C is a flow diagram of a payment process 740 according to another embodiment of the invention. The payment process 740 can represent at least a portion of the processing associated with the block 510 illustrated in FIG. 5. The payment process 740 determines 742 an upgrade cost for the user. Here, the upgrade cost to the user is, according to one embodiment, the difference in the cost of the bundle less the cost of the items of the bundle previously purchased. Next, the payment for the upgrade cost for the bundle can be processed 744.

Royalty payments are often required to be provided to media content owners/distributors. In the case of music, the owners/distributors are often referred to as labels. The payment process 740 can also provide for processing of royalty payments. In particular, the payment process 740 can process 746 royalty payment for the entire bundle (even though purchaser is only acquiring a portion of the bundle via upgrade). In addition, the payment process 740 can process 748 royalty refund for previously purchased items within the bundle. In this embodiment, the royalty payment is processed in two transactions. However, in an alternative embodiment, the royalty payment could be processed in a single transaction for a net royalty due for the upgrade. Further, in the embodiment of FIG. 7C, the payment for the upgrade to the bundle can be processed as a single transaction. Alternatively, the payment for the upgrade to the bundle can be processed as two transactions such as utilized in the embodiment of FIG. 7A.

Figure 8:
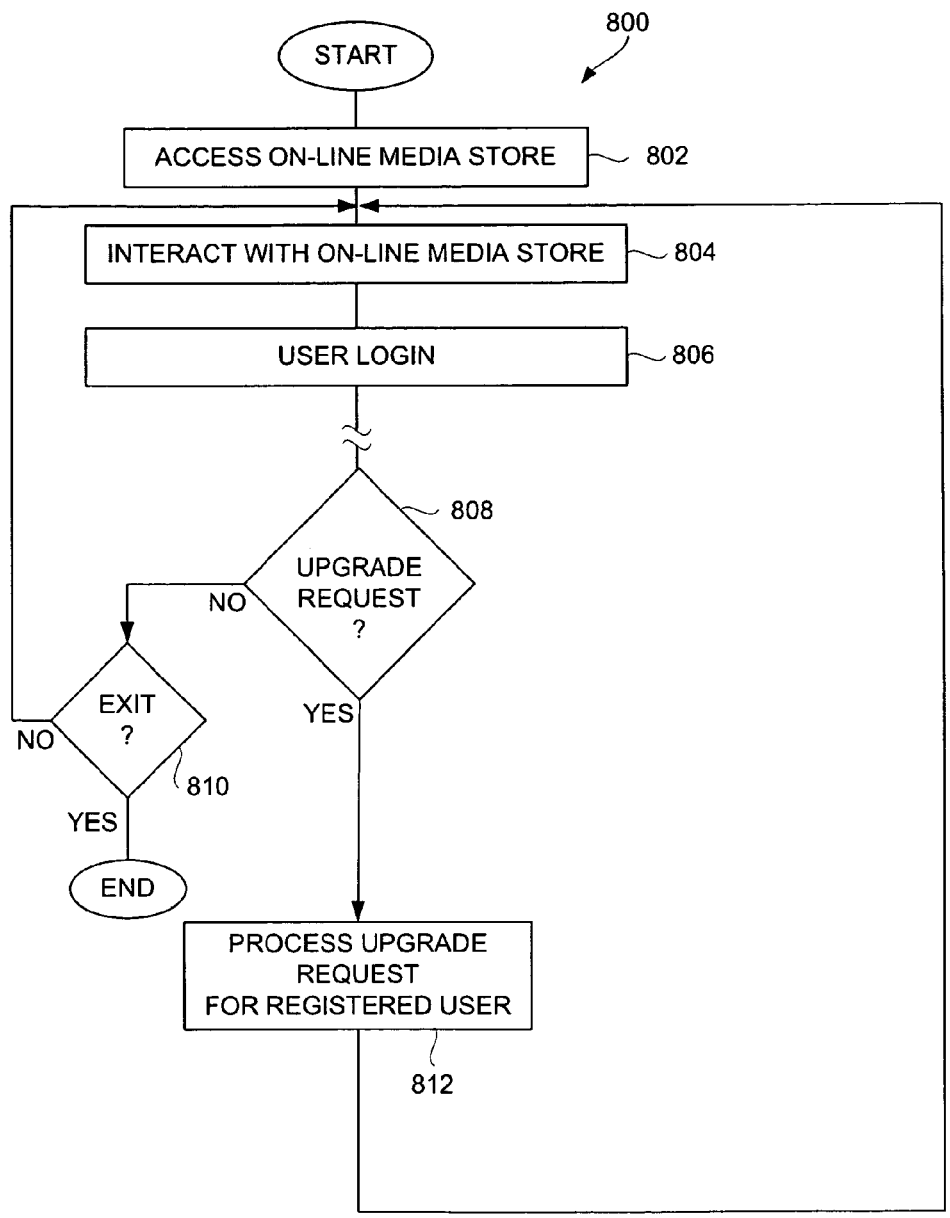
FIG. 8 is a flow diagram of an upgrade request process according to one embodiment of the invention.

FIG. 8 is a flow diagram of an upgrade request process 800 according to one embodiment of the invention. The upgrade request process 800 is, for example, performed by a server, such as the media store server 102 or the digital media manager 114 illustrated in FIG. 1.

The upgrade request process 800 begins with access 802 to an on-line media store. Typically, a user will access 802 the on-line media store via a data network, such as the Internet. Once the user has accessed 802 the on-line media store, the user can interact 804 with the on-line media store. The interaction 804 with the on-line media store can, for example, involve searching, browsing, displaying, previewing, purchasing, and/or organizing digital media assets. Although the upgrade request process 800 is primarily provided by a server, such as the media store server 102 illustrated in FIG. 1, the access 802 and the interaction 804 can be facilitated by a computer program (e.g., media management application) operating on a client device, such as the client device 104 illustrated in FIG. 1. While interacting with the on-line media store, the user may login 806 with the on-line media store. Once logged in to the on-line media store, registration information (e.g., user purchase history, account information, etc.) associated with the user can be available to the server.

Next, a decision 808 determines whether an upgrade request has been received. In one embodiment, when media store content for a set (e.g., collection or bundle) of media items is displayed by the on-line media store, an "upgrade purchase" control (e.g., button) can be presented to the user. By selection of the "upgrade purchase" control (more generally, a user interface control), the user can initiate an upgrade request. When the decision 808 determines that an upgrade request has not been received, a decision 810 determines whether the upgrade request process 800 should be exited. When the decision 810 determines that the upgrade purchase request process 800 should not exit, then the upgrade request process 800 returns to repeat the operation 804 and subsequent operations, though the login 806 can be bypassed when the user is already logged in. Alternatively, when the decision 810 determines that the upgrade request process 800 should exit, then the upgrade request process 800 ends.

On the other hand, when the decision 808 determines that an upgrade request has been received, then the upgrade request for a particular set of digital media assets is processed 812 for the user. For example, the upgrade request can purchase a set of media items such that it is associated with the user (e.g., associated with the user account for the user). Once purchased, the user acquires the various digital media assets within the particular set of media items that has been purchased. Following the operation 812, the upgrade request process 800 returns to repeat the operation 804 and subsequent operations so that additional interaction 804 with the on-line media store is permitted, including making additional upgrade requests if so desired.

Figure 9:
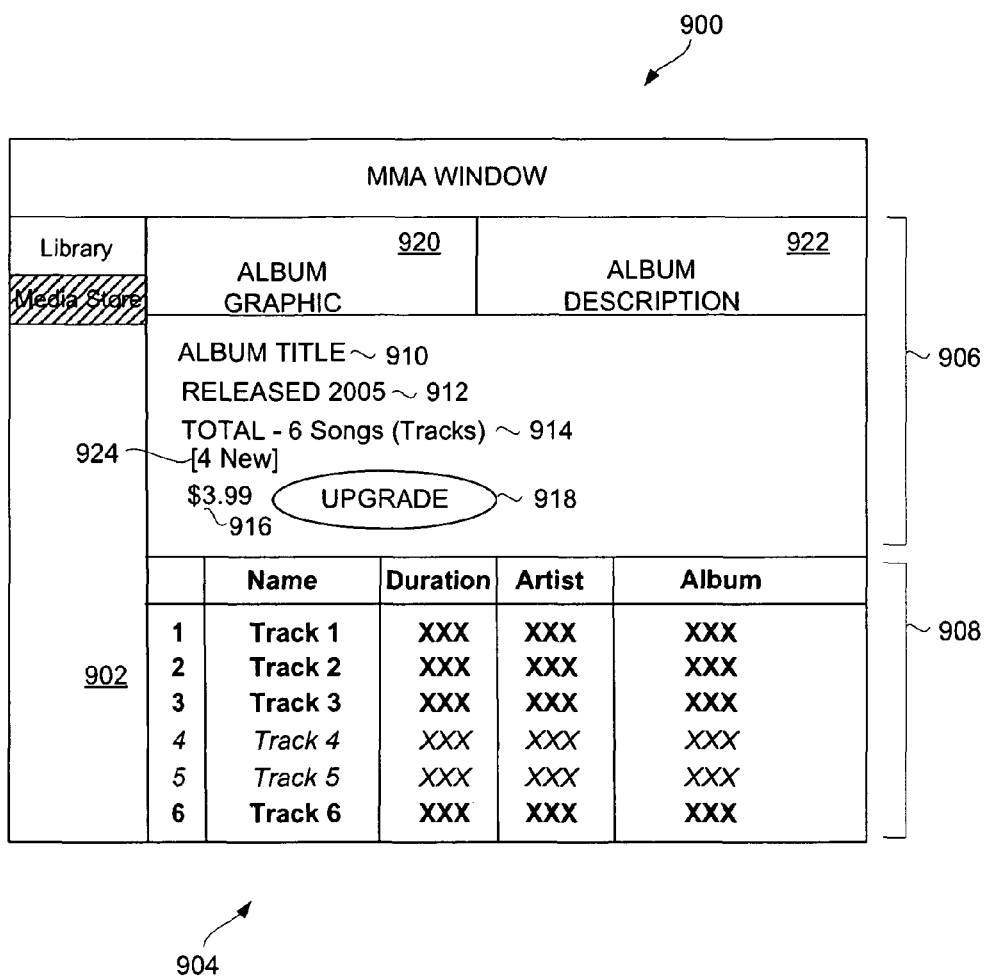
FIG. 9 is a diagram of a representative media season window according to one embodiment of the invention.

FIG. 9 is a diagram of a representative media upgrade window 900 according to one embodiment of the invention. The media upgrade window 900 is typically presented on a display device associated with a client device when the client device is interacting with the on-line media store via a computer program, such as a Media Management Application (MMA) or a network browser. The media upgrade window 900 can be provided locally or remotely. When provided remotely, the content for the media upgrade window 900 can be provided by a web site. More particularly, when the user is interacting with the on-line media store to view information pertaining to a set of media items, namely, an album, that is available for purchase on the on-line media store, the on-line media store can also cause the media upgrade window 900 to be presented on the display device. The media upgrade window 900 includes a source portion 902 and a media descriptive portion 904. The source portion 902 indicates the source for the information being presented in the media descriptive portion 904. In this example, the source portion 902 indicates that a "Media Store" has been selected, such that the information being presented in the media descriptive portion 904 is information provided by an on-line media store. In this case, the information corresponds to one of a plurality of albums of music that are available for purchase from the on-line media store. The media descriptive portion 904 includes an album information portion 906 and a track listing area 908. The album information portion 906 includes information pertaining to the album. Hence, the album information portion 906 includes an album title 910, a release date 912, total number of tracks 914 for the album, a total cost 916 for the upgrade to the album, and an "UPGRADE" button 918. Upon selecting the "UPGRADE" button 918, the user requests to upgrade to the purchase of the particular album. The album information portion 906 can also display an album graphic 920 and an album description 922 for the album. The album graphic 920, for example, can be a still graphic, animated graphics or video associated with the album. The album description 922 can provide additional detail on the album being purchased.

The track listing area 908 illustrates the tracks of the album. For each of the tracks listed in the track listing area, the name, duration, artist and album for such tracks can be displayed in the track listing area 908. In this example, it is assumed that the user already has tracks 4 and 5 of the album. As such, tracks 4 and 5 are visually distinguished (e.g., italicized, grayed-out, labeled, symbols, etc.) from the other tracks of the album. Some examples of labeling is to denote such tracks are "previously downloaded," "previously acquired," "already purchased", etc. Hence, by upgrading to the album, the user acquires tracks 1-3 and 6. Optionally, the album information area 906 can also include an indication on what portion of the album the user will acquire on upgrade. For example, in the example illustrated in FIG. 9, a visual indication 924 is provided. The visual indication 924 is "4 new" indicating to the user that if they upgrade they will gain four additional tracks from the album that they do not presently have. The visual indication could take various other forms, such as a graphical representation or other numerical or symbol representation.

In one embodiment, although an upgrade opportunity might be available to a user, the user can be given the option to upgrade to a set (or bundle) of media assets or to purchase the entire set of media assets. For example, the album information portion 906 can also include a selectable control (e.g., link) that can be used to enable the user to opt to purchase the entire set of media assets.

Figure 10:
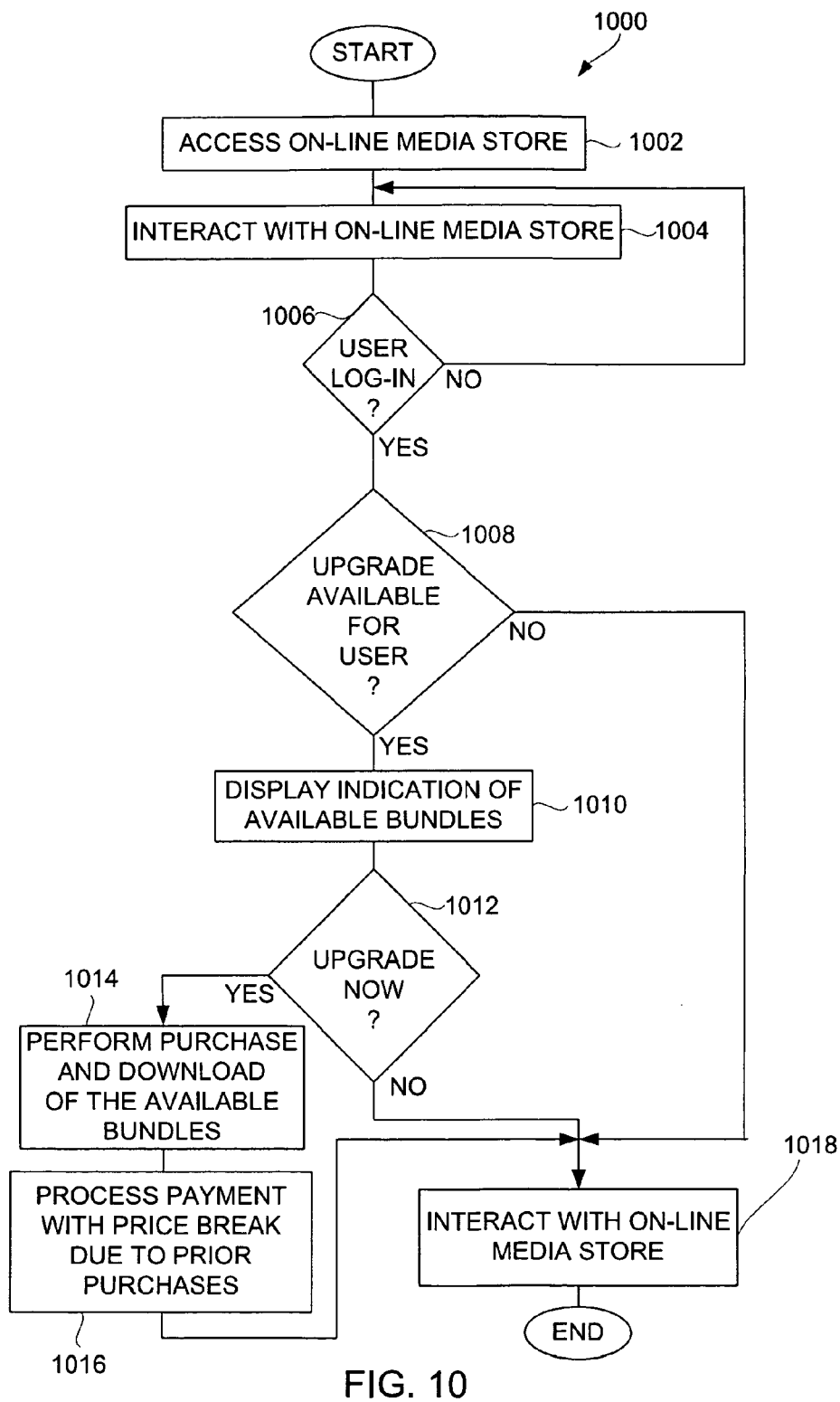
FIG. 10 is a flow diagram of a media bundle purchase process according to one embodiment of the invention.

FIG. 10 is a flow diagram of a media bundle purchase process 1000 according to one embodiment of the invention. The media bundle purchase process 1000 concerns the purchase and delivery of bundles of media items to users that have requested to upgrade.

The media bundle purchase process 1000 initially involves access 1002 to an on-line media store. Typically, a user gains access 1002 to the on-line media store via a data network, such as the Internet. After the user has access 1002 to the on-line media store, the user can interact 1004 with the on-line store. Certain interactions with the on-line media store, such as purchasing and downloading, require that the user be a registered user. In this regard, the on-line media store requires that a user log in to authenticate that the user is indeed a registered user of the on-line media store. Hence, when the interaction 1004 requires such login, a decision 1006 determines whether the user has successfully logged in to the on-line media store. When the decision 1006 determines that the user has not yet logged in, then the media bundle purchase process 1000 returns to repeat the operation 1004 for other interaction with the on-line media store.

On the other hand, when the decision 1006 determines that the user has successfully logged-in, a decision 1008 determines whether any upgrades are available for the user. When the decision 1008 determines that there are one or more upgrades available for the user, an indication of the one or more available bundles is displayed 1010 for the user. For example, a dialog box can be presented on a display screen that the user is able to view. The dialog box can list the one or more available bundles and allow the user to choose the one or more available bundles. As another example, a web page, GUI window or a portion of a display screen can present to the user those bundles that are available for upgrade.

Thereafter, a decision 1012 determines whether the user desires to upgrade to the one or more available bundles at this time. When the decision 1012 determines that the user does desire to upgrade to the one or more available bundles, purchase and download of the one or more available bundles is performed 1014. Also, payment for the one or more available bundles can be processed 1016. The payment for each of the one or more available bundles can provide a price break (i.e., discount) in view of prior purchases of items within the bundle. Following the decision 1012 when upgrade to the one or more available bundles is not desired or following the payment operation 1016 when upgrade to the one or more available bundles is desirable, additional interaction 1018 with the on-line media store can be provided for the user. Additionally, following the decision 1008 when there are no available upgrades for the user, the media bundle purchase process 1000 bypasses the operations 1010-1016 and proceeds to permit the additional interaction 1018 with the on-line media store. Eventually, when no further interaction 1018 with the on-line media store is desired, the media bundle purchase process 1000 ends.

Upgrade opportunities for a user can be presented in a variety of ways. As one example, an on-line media store can maintain purchase history information for its users (e.g., account holders or registered users). When a user accesses their user purchase history information, an indication of available upgrade opportunities can be presented to the user. As still another example, when an invoice or account statement is presented to a user it can include an indication of one or more upgrade opportunities. The indication can, for example, pertain to a link (e.g., hyperlink) to a web page (or network address) where the corresponding bundle is described and where upgrade to the bundle can be initiated via user interaction with the web page.

Figure 11A:
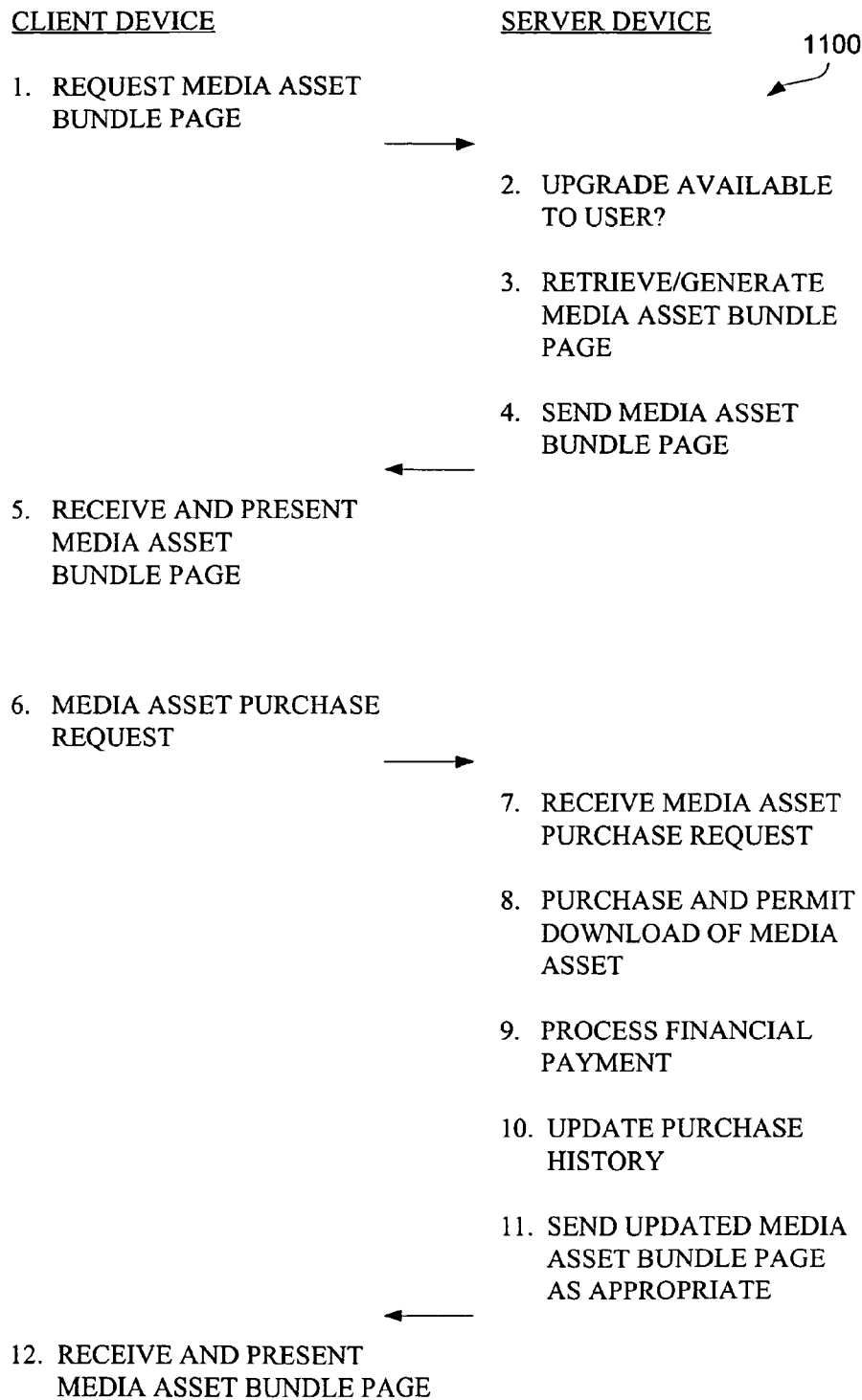
FIGS. 11A and 11B are diagrams illustrating a client-server upgrade arrangement according to one embodiment of the invention.
Figure 11B:
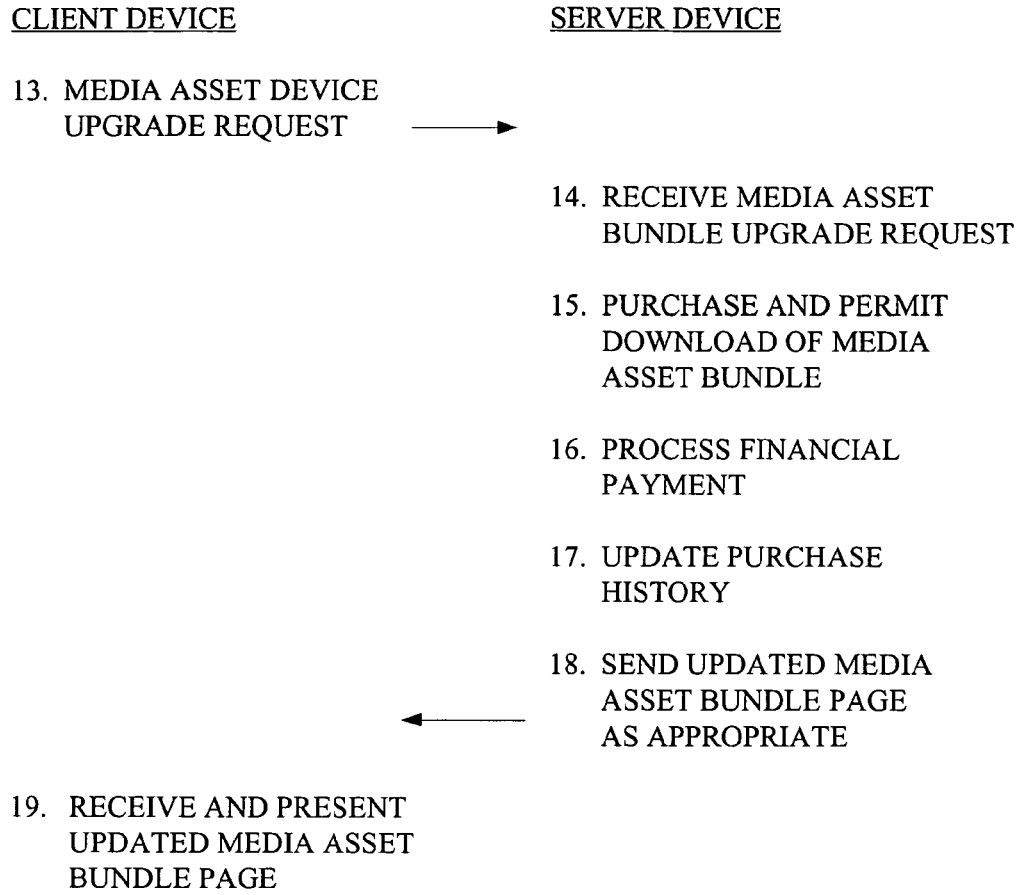

FIGS. 11A and 11B are diagrams illustrating a client-server upgrade arrangement 1100 according to one embodiment of the invention. The client-server upgrade arrangement 1100 illustrates processing performed at a client device as well as processing performed at a server device. The sequence of steps illustrated in FIGS. 11A and 11B represent only one embodiment of the invention. Hence, it should be recognized that other processing sequences can be utilized.

As illustrated in FIG. 11A, initially, at the client device, a request to obtain a media asset bundle page is sent to a server device (step 1). The server device then determines whether an upgrade is available to the user (step 2). The server device can then operate to retrieve and/or generate the media asset bundle page that is being requested (step 3). Here, it should be noted that the media asset bundle page being retrieved and/or generated is dependent upon whether an upgrade is available to the user with respect to the media asset bundle. After the media asset bundle page has been retrieved and/or generated (step 3), the media asset bundle page can be sent (step 4) to the client device.

At the client device, the media asset bundle page can be received and presented (step 5). At this point, in one embodiment, the media asset bundle page is displayed at the client device so as to present information concerning the media asset bundle to the user of the client device. The user can interact with the media asset bundle page in a variety of different ways, as are commonly performed with respect to web pages. One interaction that a user can make with the media asset bundle page is to request to purchase a particular media asset that is one of the media assets within the media asset bundle. Hence, a request to purchase a media asset can be initiated by the user and a corresponding media asset purchase request can be sent to the server device (step 6).

The server device then receives (step 7) the media asset purchase request. The media asset can then be purchased and permitted to be downloaded to the client device associated with the requesting user (step 8). The server device can also process financial payment for the media asset (step 9). Here, the financial payment for the purchase is at least initiated. In one embodiment, the user has an account with the on-line media store, so initiation of the payment can be simply associating the transaction with the corresponding user. In addition, the purchase history associated with the user can be updated (step 10) to indicate that the user has purchased the particular media asset. Further, an updated media asset bundle page can be sent (step 11) back to the client device as is appropriate. For example, after a media asset from a media asset bundle has been purchased (assuming that the media asset bundle page offers the user the option of upgrading to the media asset bundle), the upgrade cost may require updating once the user has purchased another media asset that is part of the media asset bundle. Hence, the updated media asset bundle page can be sent (step 11) to the client device. The client device can then receive and present (step 12) the updated media asset bundle page.

The user of the client device can also interact with the media asset bundle page being received and presented (step 5) or being received and presented (step 12) in a variety of different ways. One interaction that a user can make with the media asset bundle page is to request to purchase the media asset bundle. The request to purchase can pertain to purchase of the entire media asset bundle or to upgrade to the entire media asset bundle. Accordingly, one particular way that a user can interact with the media asset bundle page is to request to upgrade to the media asset bundle. In such a case, a media asset bundle upgrade request can be sent (step 13) from the client device to the server device.

The server device receives (step 14) the media asset bundle upgrade request. The server device can proceed to purchase and permit download of the media asset bundle (step 15). In one implementation, the media asset bundle can be completely permitted for download to the client device. In another implementation, only those of the media assets within the media asset bundle that the user or client device has not already received (e.g., has not already purchased) are permitted for download. In addition, the server device can initiate financial payment processing for the media asset bundle upgrade (step 16). Information concerning the upgrade purchase can also be stored in the purchase history (step 17). In addition, the server device can send (step 18) an updated media asset bundle page to the client device as appropriate. Typically, once the client device has purchased and received the remaining media assets within the media asset bundle, the previously presented media asset bundle page can be updated to indicate that the upgrade opportunity is no longer present. The updated media asset bundle page can also indicate that all of the media assets associated with the media asset bundle are available (e.g., stored locally) at the client device. The client device can receive and present (step 19) the updated media asset bundle page.

Figure 12:
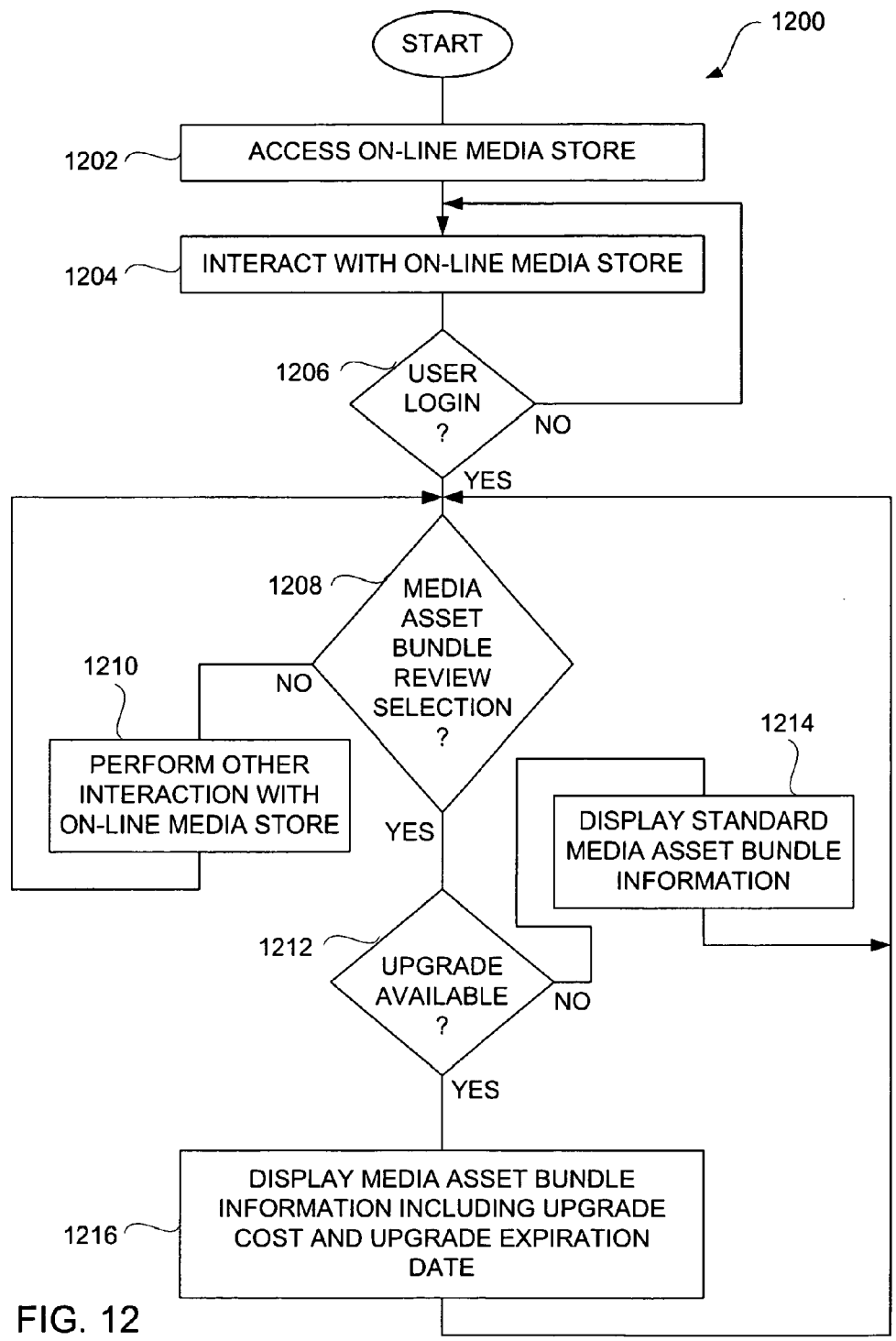
FIG. 12 is a flow diagram of a media asset bundle browse process according to one embodiment of the invention.

FIG. 12 is a flow diagram of a media asset bundle browse process 1200 according to one embodiment of the invention. The media asset bundle browse process 1200 provides access 1202 to an on-line media store. The on-line media store makes available individual media assets as well as bundles of media assets. Interaction 1204 can then be performed with respect to the on-line media store, typically over a network. The interaction 1204 is typically initiated by a user. A decision 1206 determines whether a user has logged in with respect to the on-line media store. Typically, users have previously registered for accounts with the on-line media store. When a user logs in to the on-line media store, the user is associated with their previously established account. Hence, the decision 1206 determines whether a user has logged in to the on-line media store. When the user has not logged in to the on-line media store, the media asset bundle browse process 1200 returns to repeat the block 1204. Here, the user can continue to interact 1204 with the on-line media store but such is limited to interaction that does not require knowledge of the account associated with the user.

Alternatively, when the decision 1206 determines that the user has logged in to the on-line media store, additional features or interactions can be offered to the user. For example, the on-line media store can offer the user opportunities to upgrade to one or more media asset bundles. In particular, a decision 1208 determines whether a media asset bundle review selection has been made by the user. The media asset bundle review selection is a selection by the user that requests to review information pertaining to a media asset bundle. When the decision 1208 determines that a media asset bundle review selection has not been made, then other interaction with the on-line media store can be performed 1210. Following the block 1210, the media asset bundle browse process 1200 returns to repeat the decision 1208 and subsequent operations.

On the other hand, when the decision 1208 determines that a media asset bundle review selection has been made, a decision 1212 determines whether upgrade is available for the particular media asset bundle. Here, in one embodiment, the availability of the upgrade is dependent upon the user and when and what individual media assets the user has previously purchased that are associated with the media asset bundle. When the decision 1212 determines that an upgrade is not available to the user with respect to the media asset bundle, standard media asset bundle information can be displayed 1214. The standard media asset bundle information presents information concerning the media asset bundle but does not include information or the functionality to permit the user to request an upgrade to the media asset bundle. On the other hand, when the decision 1212 determines that an upgrade to the media asset bundle is available to the user, media asset bundle information including upgrade cost and upgrade expiration date can be displayed 1216 to the user. Here, the media asset bundle information is presenting to the user an opportunity to upgrade to the media asset bundle. The upgrade cost and the upgrade expiration date are, however, typically dependent upon the particular user. Following the block 1216, the media asset bundle browse process 1200 returns to repeat the decision 1208 and subsequent operations.

Figure 13A:
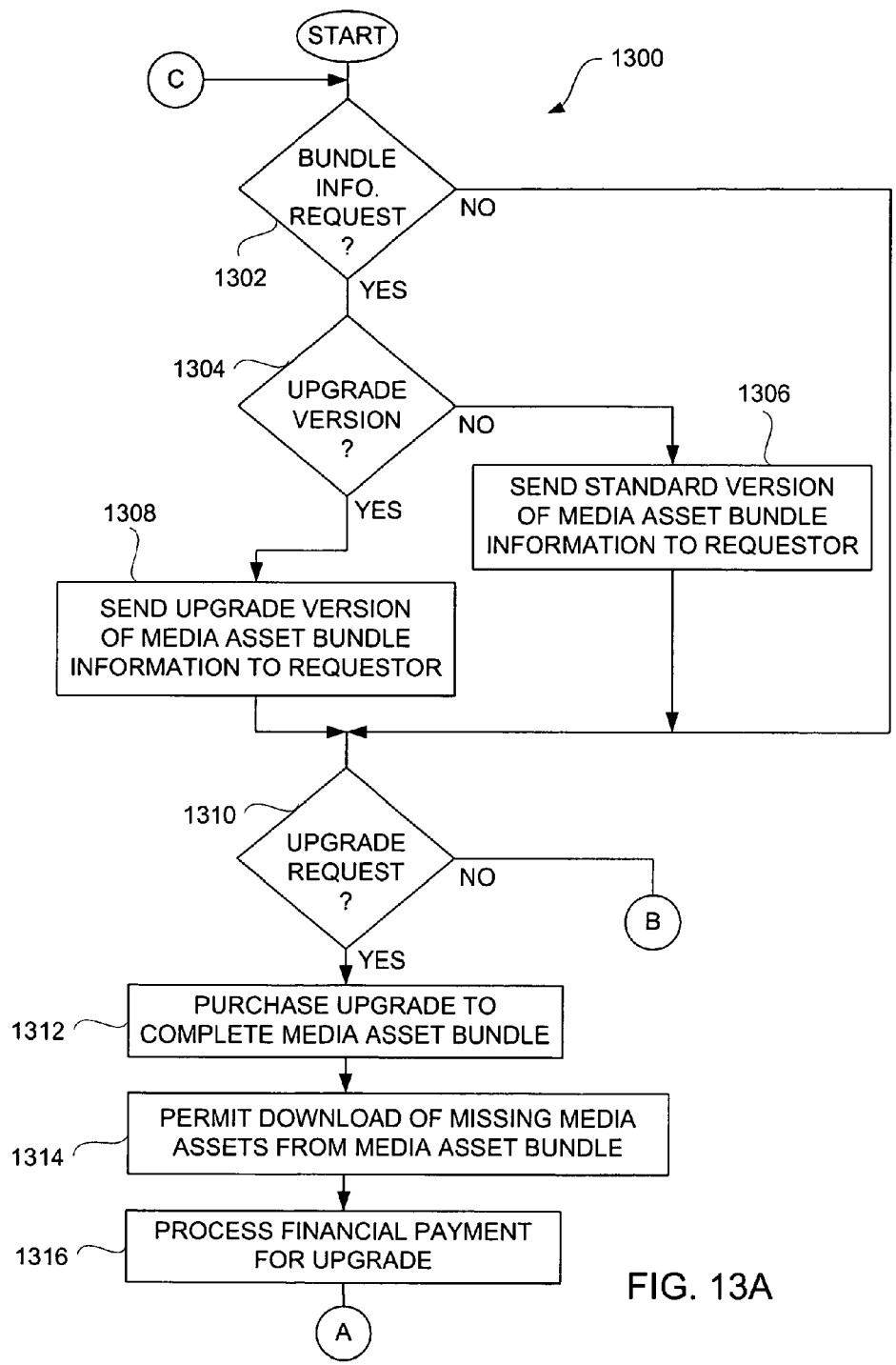
FIGS. 13A and 13B illustrate a server upgrade support process according to one embodiment of the invention.
Figure 13B:
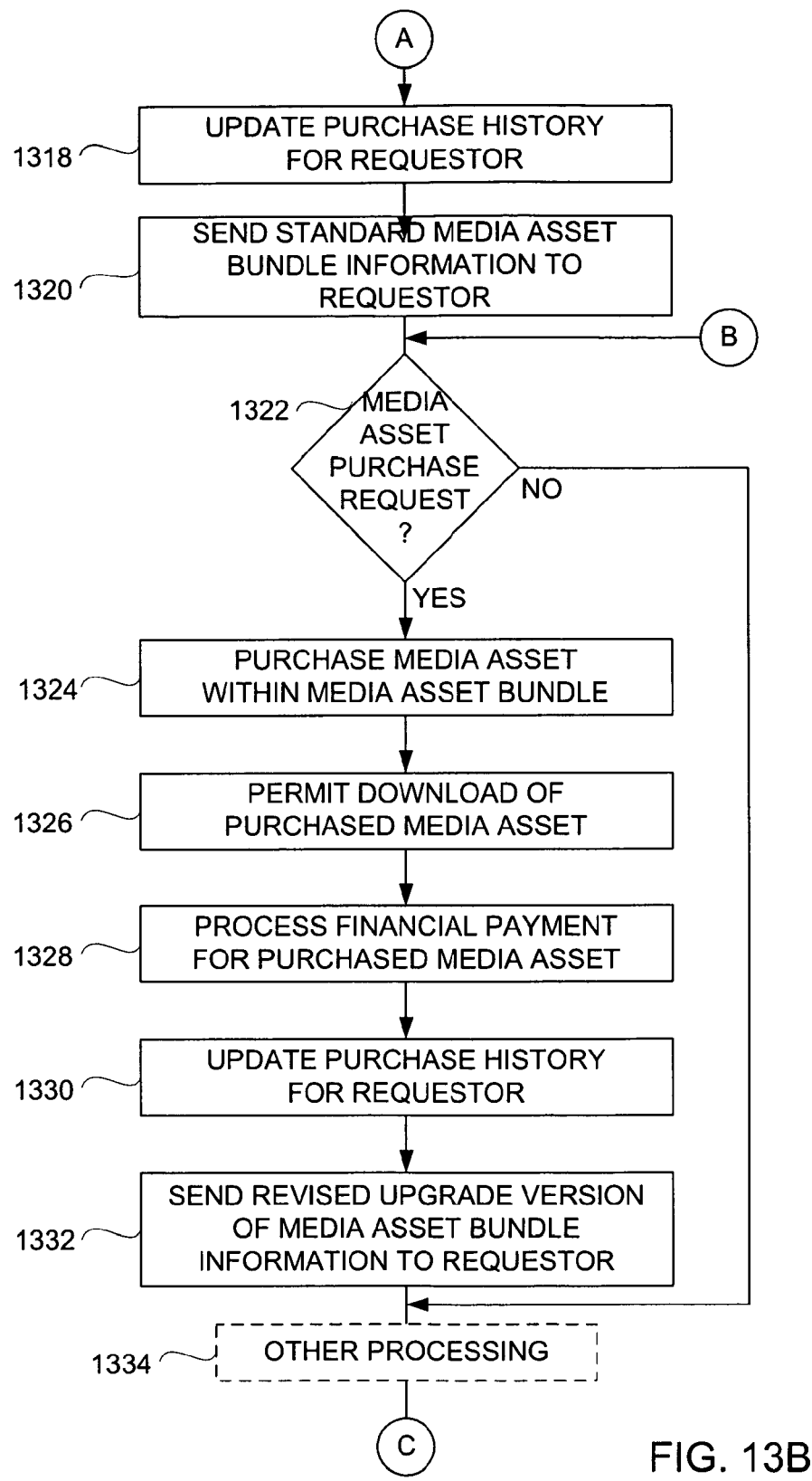

FIGS. 13A and 13B illustrate a server upgrade support process 1300 according to one embodiment of the invention. The server upgrade support process 1300 is, for example, performed by a server device.

The server upgrade support process 1300 begins with a decision 1302. The decision 1302 determines whether a bundle information request has been received. When the decision 1302 determines that a bundle information request has been received, a decision 1304 determines whether an upgrade version of the bundle information should be provided to the requestor. When the decision 1304 determines that an upgrade version should not be provided to the requestor, a standard version of media asset bundle information is sent 1306 to the requestor. Alternatively, when the decision 1304 determines that an upgrade version should be provided to the requestor, an upgrade version of media asset bundle information is sent 1308 to the requestor.

Following the blocks 1306 and 1308, as well as following the decision 1302 directly when a bundle information request is not received, a decision 1310 determines whether an upgrade request has been received. When the decision 1310 determines that an upgrade request has been received, an upgrade to complete the media asset bundle is purchased 1312. Those media assets missing from the media asset bundle are permitted 1314 to be downloaded to the requestor. Here, the missing media assets are those media assets from the media asset bundle that the requestor has not already received. Typically, the media assets that the requestor has previously received are those media assets that the requestor previously purchased. Financial payment for the upgrade can also be processed 1316. Further, purchase history for the requestor can be updated 1318. The purchase history can, for example, be updated to indicate that the requestor purchased an upgrade to a particular media asset bundle, on a particular date, for a particular cost. After the purchase of the upgrade to the complete media asset bundle is performed, the media asset bundle information should no longer offer the upgrade opportunity to the requestor. Accordingly, standard media asset bundle information can be sent 1320 to the requestor. Here, by sending 1320 the standard media asset bundle information to the requestor, the display of the media asset bundle information to the requestor can be updated or refreshed.

Following the block 1320, or following the decision 1310 directly when an upgrade request is not received, a decision 1322 determines whether a media asset purchase request has been received. When the decision 1322 determines that a media asset purchase request has been received, a media asset within the media asset bundle is purchased 1324 by the requestor. Here, the requestor has requested to purchase a particular media asset as opposed to purchasing an upgrade to the complete media asset bundle. After the media asset has been purchased 1324, download of the purchased media asset can be permitted 1326. Financial payment for the purchased media asset can also be processed 1328. In addition, purchase history for the requestor can be updated 1330 to indicate the particular media asset has been purchased. The purchase history can, for example, be updated to indicate that the requestor purchased a particular media asset, on a particular date, for a particular cost.

Following the block 1330, a revised upgrade version of media asset bundle information can be sent 1332 to the requestor. Here, since the requestor has purchased a particular media asset within the media asset bundle, the upgrade opportunity can be altered in view of such purchase. Hence, a revised upgrade version of the media asset bundle information can be sent 1332 to the requestor. As an example, the revised upgrade version of the media asset bundle information could have a different upgrade cost to the requestor for performing the upgrade to the complete media asset bundle. For example, since the requestor just purchased the particular media asset within the media asset bundle, the number of media assets required to complete to the media asset bundle is now lower, therefore, the upgrade cost can be reduced following the purchase of the particular media asset. As another example, the media asset bundle information can present a list of media assets associated with the media asset bundle and also designate those of the media assets within the media asset bundle that the requestor has already acquired (e.g., purchased). In such case, following the purchase of the particular media asset within the media asset bindle, the list of media assets can be updated so that the recently purchased particular media asset is designated as being already acquired.

Following the block 1332, as well as following the decision 1322 directly when a media asset purchase request is not received, the server upgrade support process 1300 can optionally perform other processing 1334 that may be supported by the server device. Following the block 1334 if utilized, the server upgrade support process 1300 returns to repeat the decision 1302 and subsequent blocks so that the server upgrade support processing 1300 can continue to service a variety of different requests that may be received at the server device.

Figure 14A:
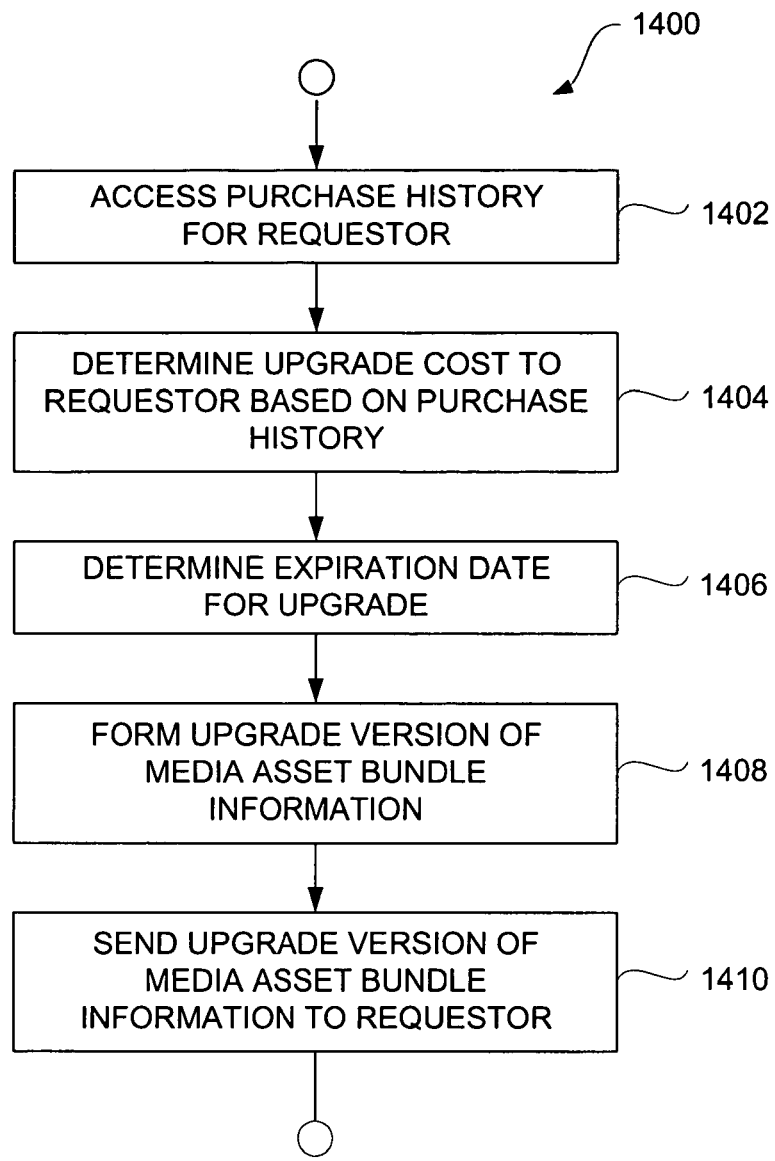
FIG. 14A is a flow diagram of upgrade version processing according to one embodiment of the invention.

FIG. 14A is a flow diagram of upgrade version processing 1400 according to one embodiment of the invention. The upgrade version processing 1400 is, for example, processing associated with block 1308 of the server upgrade support process 1300 illustrated in FIG. 13A.

The upgrade version processing 1400 accesses 1402 purchase history for the requestor. Typically, the purchase history for the requestor is maintained at the server device. Alternatively or additionally, the purchase history could be maintained at the client device. After the purchase history has been accessed 1402, upgrade cost to the requestor can be determined 1404 based on the purchase history. In one embodiment, the upgrade cost is dependent upon the cost that the requestor has previously incurred in order to purchase media assets that are within the media asset bundle being offered as an upgrade opportunity. Hence, in such an embodiment, the purchase history stores data on the date and cost of previously purchased media assets.

Next, an expiration date for the upgrade can be determined 1406. In one embodiment, the expiration date is a predetermined number of days (e.g., 30, 60, 90, 180 or 360 days) following the initial purchase of a media asset within the media asset bundle. However, the expiration date can be set based on other criteria. An upgrade version of media asset bundle information can also be formed 1408. In one implementation, the media asset bundle information is formed 1408 as a page, such as a mark-up language page. Thereafter, the upgrade version of the media asset bundle information can be sent 1410 to the requestor.

Figure 14B:
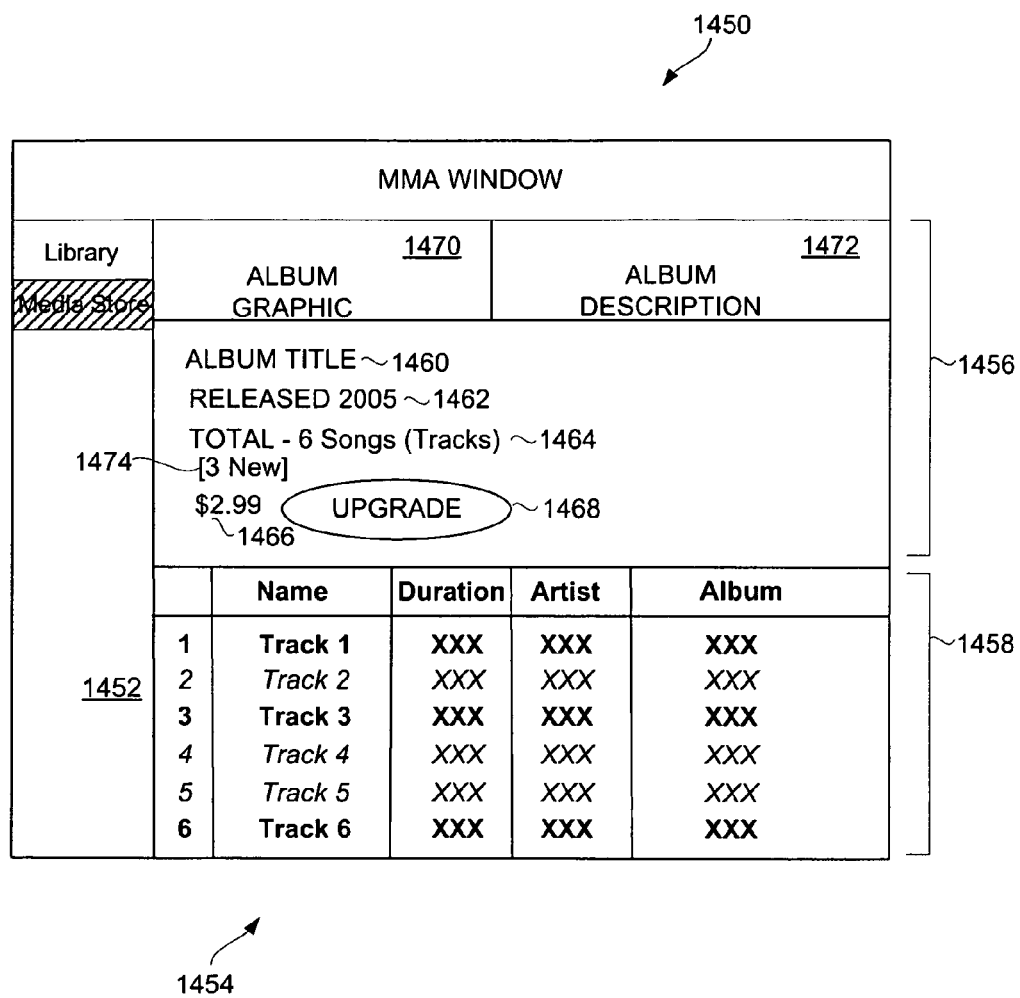
FIG. 14B is a diagram of a representative media upgrade window according to one embodiment of the invention.

FIG. 14B is a diagram of a representative media upgrade window 1450 according to one embodiment of the invention. The media upgrade window 1450 can represent an updated version of the media upgrade window 900 illustrated in FIG. 9A after another of the media assets within the set (e.g., bundle) of media assets is purchased. The media upgrade window 1450 is typically presented on a display device associated with a client device when the client device is interacting with the on-line media store via a computer program, such as a Media Management Application (MMA) or a network browser. The media upgrade window 1450 can be provided locally or remotely. When provided remotely, the content for the media upgrade window 1450 can be provided by a web site. More particularly, when the user is interacting with the on-line media store to view information pertaining to a set of media items, namely, an album, that is available for purchase on the on-line media store, the on-line media store can also cause the media upgrade window 1450 to be presented on the display device. The media upgrade window 1450 includes a source portion 1452 and a media descriptive portion 1454. The source portion 1452 indicates the source for the information being presented in the media descriptive portion 1454. In this example, the source portion 1452 indicates that a "Media Store" has been selected, such that the information being presented in the media descriptive portion 1454 is information provided by an on-line media store. In this case, the information corresponds to one of a plurality of albums of music that are available for purchase from the on-line media store. The media descriptive portion 1454 includes an album information portion 1456 and a track listing area 1458. The album information portion 1456 includes information pertaining to the album. Hence, the album information portion 1456 includes an album title 1460, a release date 1462, total number of tracks 1464 for the album, a total cost 1466 for the upgrade to the album, and an "UPGRADE" button 1468. Upon selecting the "UPGRADE" button 1468, the user requests to upgrade to the purchase of the particular album. The album information area 1456 can also display an album graphic 1470 and an album description 1472 for the album. The album graphic 1470, for example, can be a still graphic, animated graphics or video associated with the album. The album description 1472 can provide additional detail on the album being purchased.

The track listing area 1458 illustrates the tracks of the album. For each of the tracks listed in the track listing area, the name, duration, artist and album for such tracks can be displayed in the track listing area 1458. In this example, it is assumed that the user already has tracks 2, 4 and 5 of the album. As such, tracks 2, 4 and 5 are visually distinguished (e.g., italicized, grayed-out, labeled, symbols, etc.) from the other tracks of the album. Some examples of labeling is to denote such tracks are "previously downloaded," "previously acquired," "already purchased", etc. As compared, to the media upgrade window 900 illustrated in FIG. 9A, the track 2 is now visually distinguished as having been previously obtained. Hence, upgrading to the album, the user acquires tracks 1, 3 and 6. Optionally, the album information area 1456 can also include an indication on what portion of the album the user will acquire on upgrade. For example, in the example illustrated in FIG. 14B, a visual indication 1474 is provided. The visual indication 1474 is "3 New" indicating to the user that if they upgrade they will gain three additional tracks from the album that they do not presently have. The visual indication could take various other forms, such as a graphical representation or other numerical or symbol representation.

Another aspect of the invention pertains to the storage of purchase history data. Typically, the purchase history data is stored by a server device. However, the purchase history data could additionally or alternatively be stored locally at a client device. In one embodiment, the purchase history data is stored in a hierarchical manner to allow for improved access speed.

Figure 15:
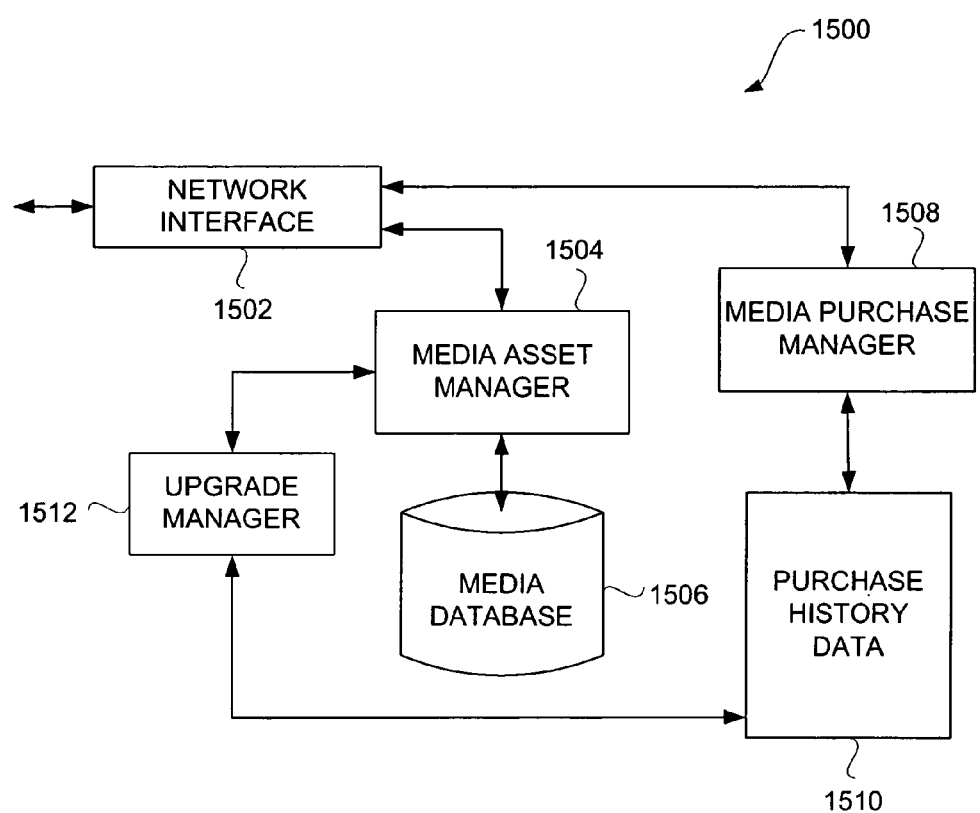
FIG. 15 is a block diagram of a server device according to one embodiment of the invention.

FIG. 15 is a block diagram of a server device 1500 according to one embodiment of the invention. The server device 1500 is, for example, suitable for use as at least a portion of the media store server 102 illustrated in FIG. 1. The server device 1500 supports browsing and purchasing of media assets. The server device 1500 includes a network interface 1502 that couples to a data network over which data can be exchanged with one or more client devices or other computing devices. A media asset manager 1504 is coupled to the network interface 1502. The media asset manager 1504 accesses a media database 1506 to obtain information regarding one or more media assets. The media asset manager 1504 can format and forward media data to a requestor via the network interface 1502. The server device 1500 also includes a media purchase manager 1508. The media purchase manager 1508 is coupled to the network interface 1502. When a requestor operating a client device requests purchase of a particular media asset, the request is transmitted to the network interface 1502 via the data network. The network interface 1502 directs the request to the media purchase manager 1508. The media purchase manager 1508 operates to a process the request to purchase the particular media asset. In doing so, the media purchase manager 1508 can update purchase history data 1510. In this regard, the purchase history data for a given requestor can specify at least a media asset identifier, price and date that the requestor purchased the particular media asset. Still further, the server device 1500 can include an upgrade manager 1512. The upgrade manager 1512 couples to the media asset manager 1504 and the purchase history data 1510. The upgrade manager 1512 can perform the various tasks associated with upgrade opportunities that are available to requestors. The upgrade opportunities are dependent upon the purchase history data 1510. The upgrade opportunities also impact the media data, or its format, that is provided to the requestor by the media asset manager 1504.

Figure 16:
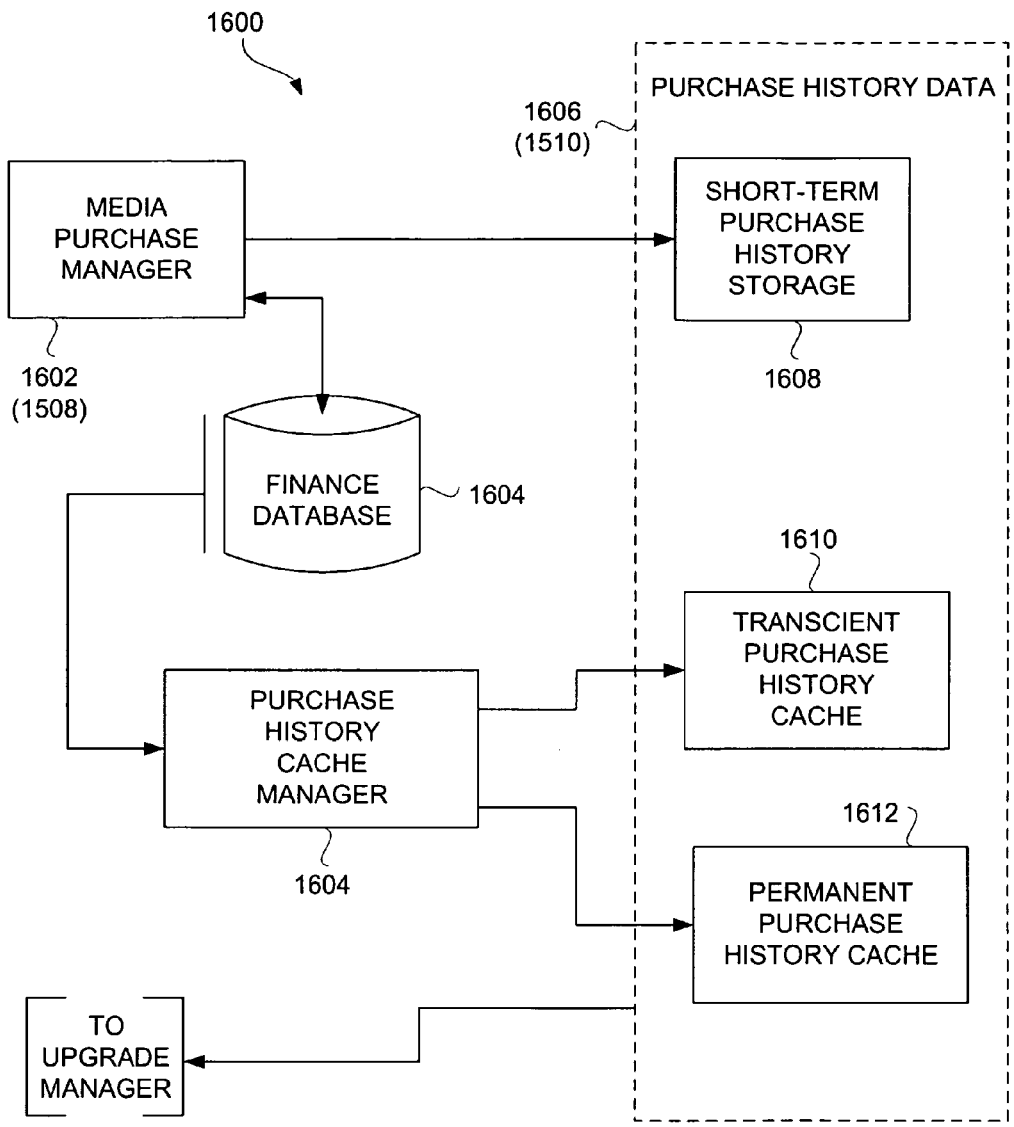
FIG. 16 is a block diagram of a purchase system according to one embodiment of the invention.

FIG. 16 is a block diagram of a purchase system 1600 according to one embodiment of the invention. The purchase system 1600 includes a media purchase manager 1602. The media purchase manager is, for example, suitable for use as the media purchase manager 1508 illustrated in FIG. 15. The media purchase manager 1602 couples to a finance database 1604. The finance database 1604 is the database that stores records pertaining to all financial transactions being provided at the server device. Here, all purchase transactions are stored within the finance database 1604. The media purchase manager 1602 also couples to purchase history data 1606. The purchase history data 1606 represents one implementation for the purchase history data 1510 illustrated in FIG. 15.

In the embodiment illustrated in FIG. 16, the purchase history data 1606 is provided in a hierarchical manner so that accurate real-time purchase history information is available to the media purchase manager 1602 and other managers, such as the upgrade manager 1512. In this regard, the purchase history data 1606 includes short-term purchase history storage 1608. In this embodiment, the media purchase manager 1602 stores information regarding purchase transactions within the short-term purchase history storage 1608. The short-term purchase history storage 1608 is utilized to provide real-time storage of recent purchase transactions. For example, the short-term purchase history storage 1608 might store the last two hours of purchase transactions with respect to the server device. The purchase history data 1606 can also include transient purchase history cache 1610. The transient purchase history cache 1610 stores information on purchase transactions on a frequent periodic basis. For example, the frequent periodic basis can be every hour. Still further, the purchase history data 1606 includes permanent purchase history cache 1612. The permanent purchase history cache 1612 stores data concerning purchase transactions for all requestors at any time previously. However, the permanent purchase history cache 1612 is only updated on a less frequent periodic basis, such as once every 24 hours. Hence, while the permanent purchase cache 1612 includes all purchase transactions, it is only up-to-date when it has been just processed. However, since the frequency at which the permanent purchase history cache 1612 is updated is only on the order of once every 24 hours, usually not all purchase transactions are within the permanent purchase history cache 1612. The transient purchase history cache 1612 is, however, updated on a more frequent basis and thus is able to provide information concerning more recent transactions that may have occurred but are not present in the permanent purchase history cache 1612. However, since even the transient purchase history cache 1610 is updated on a frequent basis, any purchase transactions that have happened between the updating based on the periodic frequency are not within the transient purchase history cache 1610. Hence, the short-term purchase history storage 1608 is able to store information on purchase transactions that have happened very recently, such as within the last one hour (or two hours). Hence, the upgrade manager 1512 is able to access the purchase history data 1606 in a manner that does not burden the financial database 1604. In addition, the access speed to such purchase history data 1606 is substantially faster than accessing the finance database 1604 since the file structure utilized are more efficiently accessed. For example, file structure can, for example, be compressed binary files. The purchase system 1600 also includes a purchase history cache manager 1614. The purchase history cache manager 1614 operates to access data records within the finance database 1604 and produce the transient purchase history cache 1610 and/or the permanent purchase history cache 1612 in accordance with their update frequencies.

The purchase history data 1606 is scalable which is important for a server device that supports heavy server loads, such as due to high volume of requests from numerous requestors, and scalability. The purchase history data 1606 also substantially isolates the finance database 1604 from such heavy server loads. The purchase history data 1606 is also organized and stored in a manner such that it is able to be rapidly accessed with even real-time ability to utilize purchase history. As an example, should a user (requestor) purchase an individual media asset, once the purchase is processed, the display of a media asset page for a media asset bundle that includes the purchased media asset can be updated in approximately real-time. In particular, if the media asset page presents an upgrade opportunity for the media asset bundle that reflects system understanding that the media asset that was just purchased causes the cost of the upgrade opportunity to be altered. Hence, the update to the media asset page with respect to the upgrade opportunity can be performed dynamically and automatically in essentially real-time.

In one embodiment, a request to provide an upgrade availability page can be processed by the server device. The upgrade availability page can present multiple media bundles that are available to the user for upgrade. A user can select any of the media bundles presented on the upgrade availability page. Upon selection of one of the media bundles on the upgrade availability page, a media asset bundle page can be presented. The user can interact with the media asset bundle page to purchase an upgrade to the media asset bundle or to purchase an individual media asset within the media asset bundle.

Figure 17A:
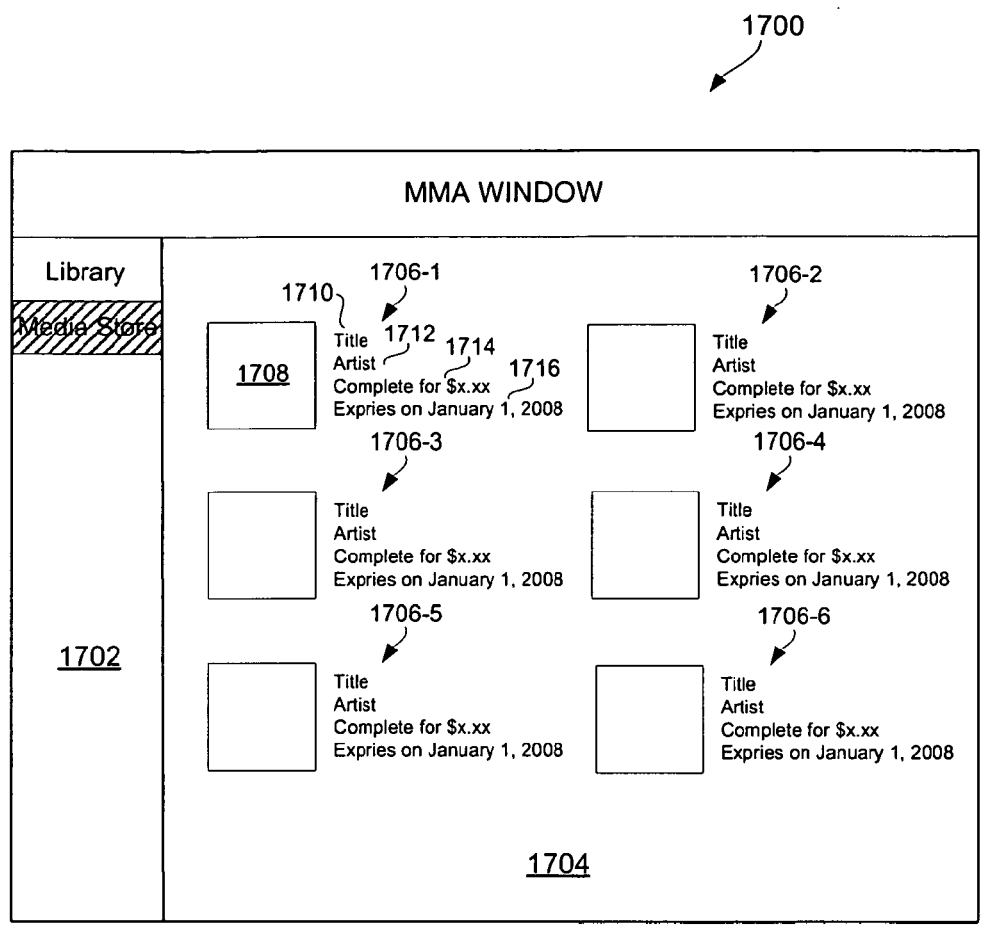
FIG. 17A is a diagram of a representative upgrade availability window according to one embodiment of the invention.

FIG. 17A is a diagram of a representative upgrade availability window 1700 according to one embodiment of the invention. The upgrade availability window 1700 can also be referred to as an upgrade availability page. The upgrade availability window 1700 is typically presented on a display device associated with a client device when the client device is interacting with the on-line media store via a computer program, such as a Media Management Application (MMA) or a network browser. The upgrade availability window 1700 can be provided locally or remotely. When provided remotely, the content for the upgrade availability window 1700 can be provided by a web site (web server or server device). More particularly, when the user is interacting with the on-line media store to view information pertaining to a set or bundle of media items, namely, an album, that is available for purchase on the on-line media store, the on-line media store can also cause the upgrade availability window 1700 to be presented on the display device.

The upgrade availability window 1700 includes a source portion 1702 and a media upgrade availability portion 1704.

The source portion 1702 indicates the source for the information being presented in the media upgrade availability portion 1704. In this example, the source portion 1702 indicates that a "Media Store" has been selected, such that the information being presented in the media upgrade availability portion 1704 is information provided by an on-line media store. In this case, the information being presented in the media upgrade availability portion 1704 corresponds to one or more media asset bundles 1706 that are available to be upgraded. In this embodiment, each of the media asset bundles 1706 can be described by a graphic 1708, a title 1710 and an artist 1712, and the upgrade opportunity can be described by an upgrade cost 1714 and an expiration data 1716. In FIG. 17A, a user can select any of the media asset bundles and then proceed to a media asset window for that media asset bundle. As an example, the media asset window can be the media upgrade window 900 associated with the selected media asset bundle. Although six (6) different media asset bundles 1706 are illustrated, the number, organization and appearance of the media asset bundles can vary with implementation.

Figure 17B:
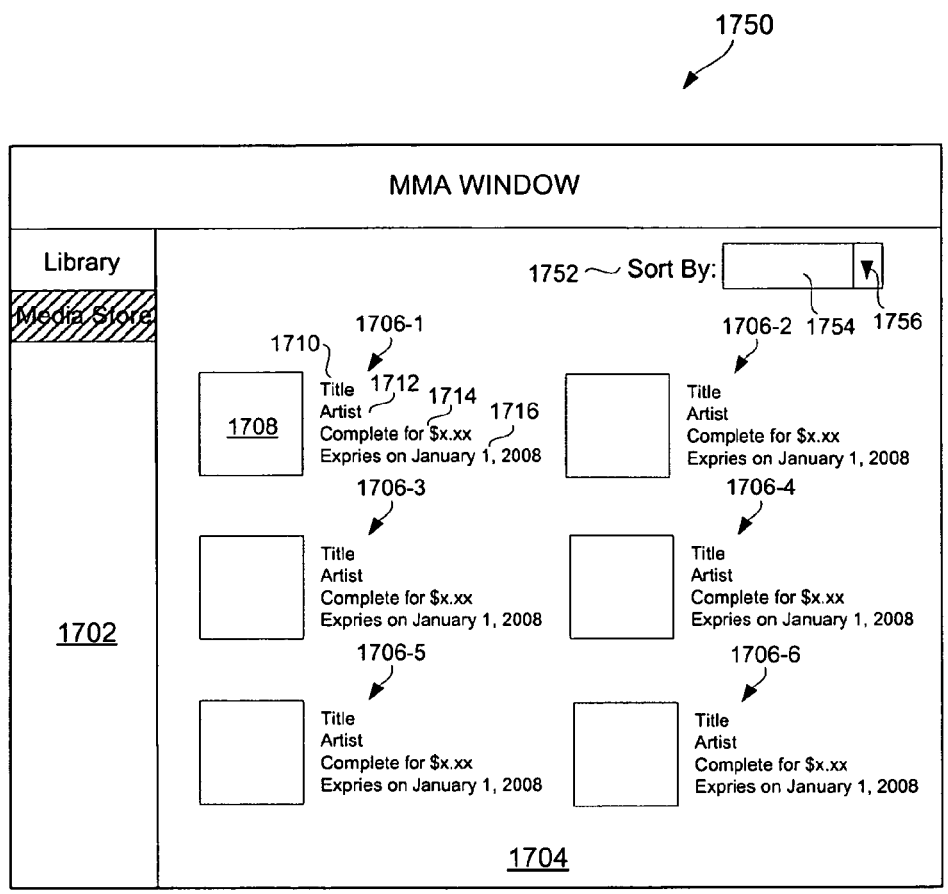
FIG. 17B is a diagram of a representative upgrade availability window according to another embodiment of the invention.

FIG. 17B is a diagram of a representative upgrade availability window 1750 according to another embodiment of the invention. The upgrade availability window 1750 can also be referred to as an upgrade availability page. The upgrade availability window 1750 can likewise be presented on the display device associated with the client device. The upgrade availability window 1750 is generally the same as the upgrade availability window 1700 illustrated in FIG. 17A. However the upgrade availability window 1750 further supports sorting of the media asset bundles that are available to be upgraded. In this regard, in one embodiment, the upgrade availability window 1750 can further include a sort control 1752. The sort control 1752 is a user interface control that enables a user to select a sort criteria 1754 and then have the media asset bundles that are available to be upgraded sorted in accordance with the selected sort criteria. In particular, the user can select a user control 1756 to display a list of available sort criteria. As an example, the list of available sort criteria can include sort criteria such as: expiration date, artist, price, purchase date, and best-sellers. The user can then select one of the available sort criteria to be used as the sort criteria 1754. The upgrade availability window 1750 can be refreshed so as to re-present the different media asset bundles 1706 in a different order based on the selected available sort criteria.

In one embodiment, login is required for a server device to recognize the user (requestor). Typically, the server device will maintain an account for the user. The user can, for example, login in using a user name and a password. If a user initiates a purchase of a media asset bundle with the on-line media store before being login (or otherwise recognized), the server device can require login to process the purchase. After successful login, the server device can present an upgrade opportunity for the media asset bundle. Here, in one implementation, although the user has already request to purchase the complete media asset bundle, the server device can inform the user of the availability of an upgrade opportunity. In other words, the user is effectively informed that they only need to purchase a portion of the media asset bundle and in doing so they can reduce their cost.

In another embodiment, when presenting an upgrade opportunity to a user for a particular media asset bundle, the system can also present to the user alternative media asset bundles that can be substituted for the particular media asset bundle. For example, the substitute media asset bundles can be different styles (live, deluxe, acoustic, remix, etc., different content (clean version or explicit version) and/or different languages.

Figure 17C:
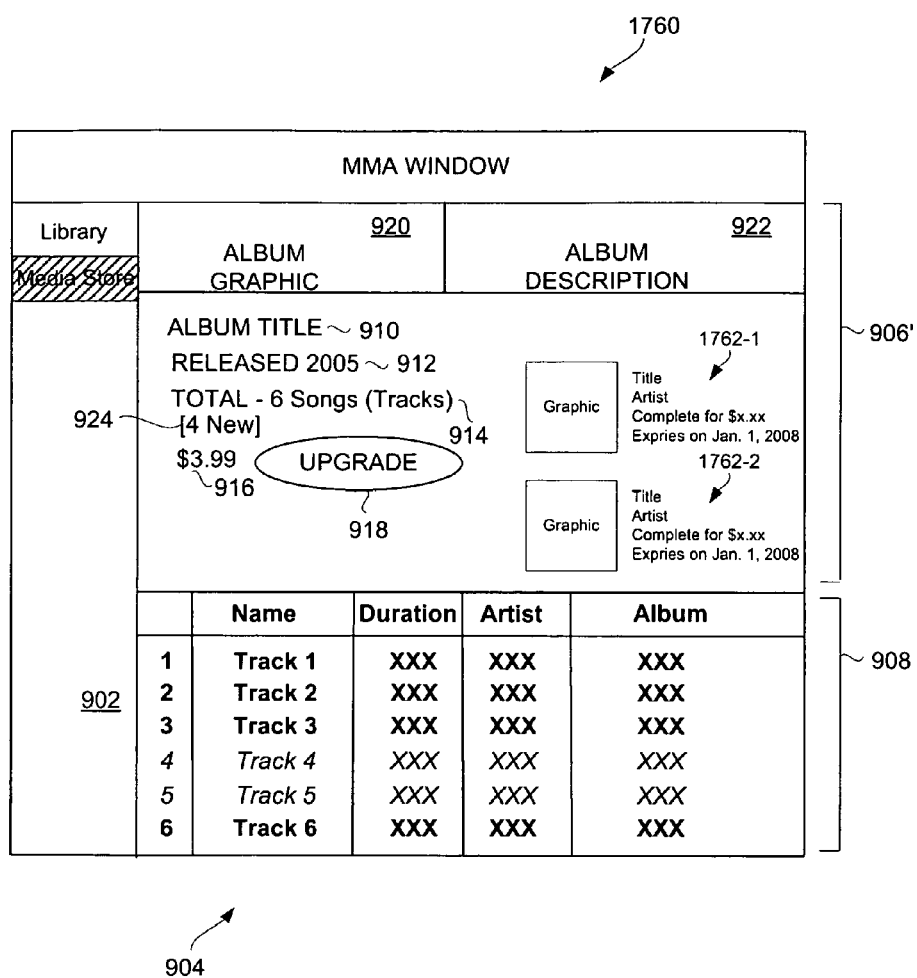
FIG. 17C is a diagram of a representative media upgrade window according to still another embodiment of the invention.

FIG. 17C is a diagram of a representative media upgrade window 1760 according to still another embodiment of the invention. The upgrade availability window 1760 can likewise be presented on the display device associated with the client device. The media upgrade window 1760 is generally similar to the media upgrade window 900 illustrated in FIG. 9. However, as illustrated in FIG. 17C, the album information portion 906' not only describes the primary album (media asset bundle) as did the album information portion 906 but also further includes information on alternative albums 1762. The alternative albums 1762 are those albums available for purchase from the on-line media store that the user can alternatively upgrade to any of the available alternative albums. As illustrated in FIG. 17C, there are two alternative albums 1762-1 and 1762-2. The album information portion 906' can present information about the alternative albums 1762-1 and 1762-2, such as a graphic, title, artist, upgrade price, and/or expiration date of upgrade opportunity. In this example, since the user previously obtained (e.g., purchased) tracks 3 and 4, the system determines that the primary album and the alternative albums include tracks that are the same or deemed equivalent to track 3 and/or track 4 which the user has already obtained. The albums can pertain to sets of media items or media asset bundles.

Another aspect of the invention pertains to determination and utilization of equivalents in determining which media bundles (media asset bundles) are to be available to a particular user for completion (upgrade). Equivalents are used to permit the system to offer more media bundles for completion. Using intelligent processing, equivalents of media items can be used to identify multiple different media bundles that can be made available to a particular user. To expedite the processing, in one embodiment, media bundle data can be created (or updated) in advance (e.g., periodically) and stored in data structures that permit rapid access, which can be important in a large volume system that needs to handle heavy loads in a scalable manner. Typically, the media bundle data is stored by a server device. However, the media bundle data could additionally or alternatively be stored locally at a client device. In one embodiment, the media bundle data can be stored in a hierarchical manner to allow for improved access speed.

Figure 18A:
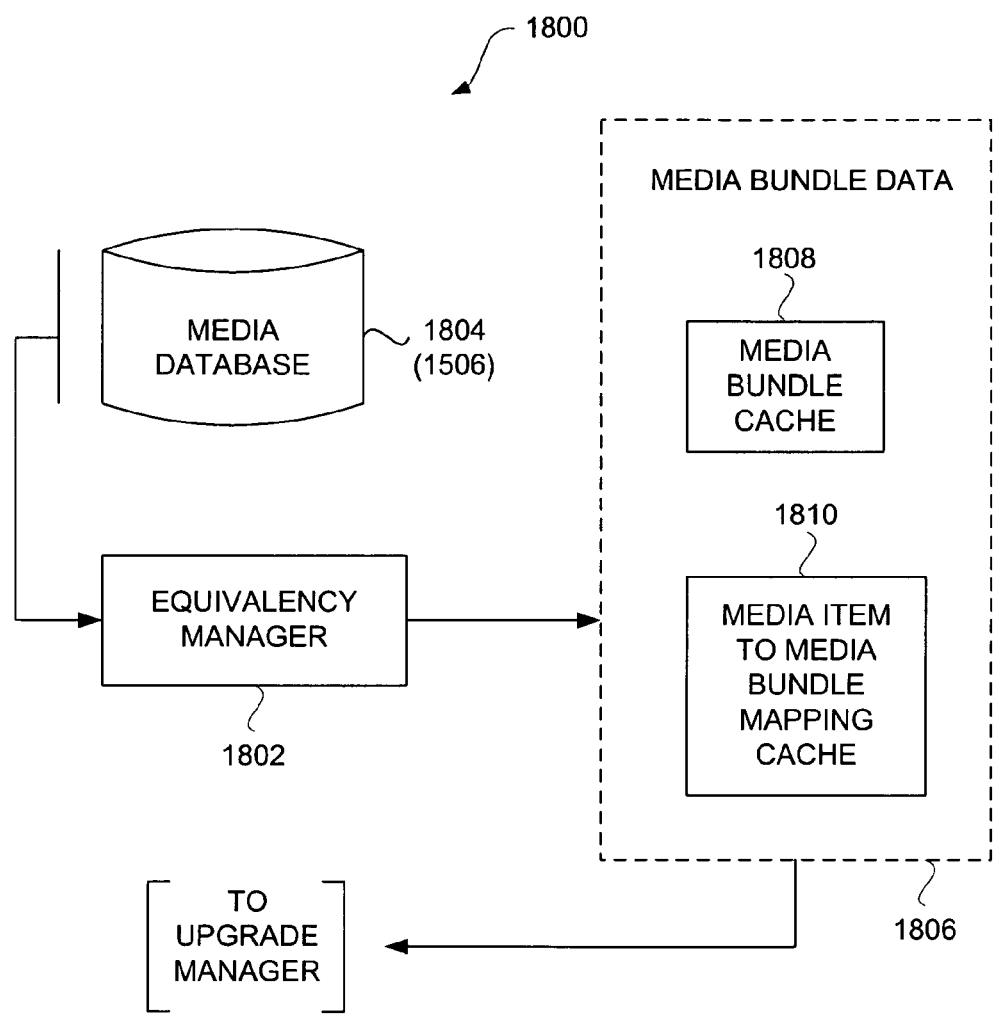
FIG. 18A is a block diagram of an equivalency system according to one embodiment of the invention.

FIG. 18A is a block diagram of an equivalency system 1800 according to one embodiment of the invention. The equivalency system 1800 includes an equivalency manager 1802. The equivalency manager 1802 is, for example, further included in the server device 1500 illustrated in FIG. 15 to perform equivalency processing. The equivalency manager 1802 couples to a media database 1804. The media database 1804 is a database that stores information regarding one or more media assets. The media database 1804 is, for example, suitable for use as the media database 1506 illustrated in FIG. 15. The equivalency manager 1802 also couples to media bundle data 1806.

In the embodiment illustrated in FIG. 18A, the media bundle data 1806 is available to an upgrade manager, such as the upgrade manager 1512. In this embodiment, the media bundle data 1806 includes a media bundle cache 1808 and media item to media bundle mapping cache 1810. In this embodiment, the media bundle cache 1808 stores information on media bundles so that one or more managers, such as the upgrade manager, can rapidly access the media bundle data. Also, in this embodiment, the media item to media bundle mapping cache 1810 stores mappings from media items to media bundles. In one embodiment, the mappings can take into consideration various equivalency rules. In other words, the media item to media bundle mapping cache 1810 can store mappings that take into consideration equivalencies to specify those media bundles that are available for completion given prior purchase of a particular media item.

The media bundle data 1806 can be provided in a hierarchical manner where the media bundle data 1806 is incrementally updated every few hours to capture newly added or altered media items or media bundles and fully updated less frequently (e.g., weekly, monthly, etc.). The media bundle data 1806 can be scalable which is important for a server device that supports heavy server loads, such as due to high volume of requests from numerous requestors. The media bundle data 1806 also substantially isolates the media database 1804 from such heavy server loads The media bundle data 1806 can also be organized and stored in a manner such that it is able to be rapidly accessed.

Equivalency rules are utilized in determining those media bundles that are available for completion to users. For example, if a user previously purchased a media item within a first media bundle, then the user can be offered that first media bundle for completion. However, the media database (e.g., media database 1506, 1805) can potentially store other media asset bundles that are equivalent or related to the first media asset bundle. Depending on implementation, some or all of these equivalent or related media bundles can also be offered for completion in lieu of or in addition to the first media bundle. In other words, the user that previously purchased a media item within the first media bundle can be offered the opportunity to upgrade to the first media bundle if still available and/or one or more other media asset bundles that are related to the first media asset bundle.

An equivalent media asset bundle (or media bundle) is a media bundle that is effectively a replacement for an original media bundle. Typically, the equivalent media bundle would have a number of media assets (e.g., media items) that would be the same or equivalent to a like number of corresponding media assets (e.g., media items) of the original media bundle. A related media asset bundle (or media bundle) is a media bundle that includes one or more (but not all) media assets (e.g., media items) that are equivalent to corresponding one or more media items in an original media bundle. Hence, the equivalency rules can be used to determine equivalent media bundles and related media bundles.

The media database can store a large number of media bundles. Typically, various content providers (e.g., recording labels) provide media bundles to the media database and permit such media bundles to be sold by an on-line media store. However, occasionally media bundles that are identical or similar are resubmitted to the media database. As one example, a resubmission of an identical or similar media bundle might be performed when a content provider alters a media bundle in some way such as by reordering the media items within the media bundle, adding an additional media item or bonus material to the media bundle, replacing a media item with another version of the same, etc. As another example, a resubmission of an identical or similar media bundle can be performed when a content provider's business entity is acquired, merged or otherwise changes its name. Moreover, content providers can offer related media bundles. For example, a content provider can permit sale of a standard media bundle as well as a deluxe media bundle. The deluxe version (or enhanced version) typically includes additional media content that is not provided with the standard version. The additional media content can, for example, be an additional media item (e.g., song, video), artist notes, liner notes, artwork, etc.

In one implementation, one or more media asset bundles can be automatically determined by locating those media bundles in the media database that include the previously acquired (e.g., purchased) media item. As an example, each media item in the media database can be identified by a unique identifier (e.g., International Standard Recording Code (ISRC) for songs). Hence, the media database can be searched for those media bundles that include a media item having the unique identifier. Although there may be several media bundles that include the previously acquired media item, upgrade opportunities can be limited based on upgrade eligibility rules. For example, an upgrade to a media bundle might be limited to only a corresponding media bundle. Namely, if the previously purchased media item was purchased as a media item from a particular media bundle, then upgrade could be limited to upgrading to that particular media bundle. However, if the particular media bundle were no longer available from the on-line media store, the upgrade to a related media bundle could be permitted. The upgrade could also be limited to (or have a preference for) upgrade to a deluxe media bundle version. Further, in some cases, the upgrade could be offered to more than one related media bundle (e.g., standard media bundle and deluxe media bundle), with perhaps a system preference for one of the related media asset bundles.

To automatically identify those media bundles that have been resubmitted, the media database can be examined for a media bundle (such as one that is now no longer available) so as to located those one or more related media bundles within the media database. When the resubmission is by a different content provider (e.g., due to name change), the media database can be accessed to identify any other media bundles from the original content provider or new content provider that have the same name and artist for the media bundle. Additionally, the media database can be accessed to determine those deluxe media bundles that are related to their counterpart standard media bundles. The media database can also be accessed to locate those media bundles that have the same initial name portion and similar media content.

Figure 18B:
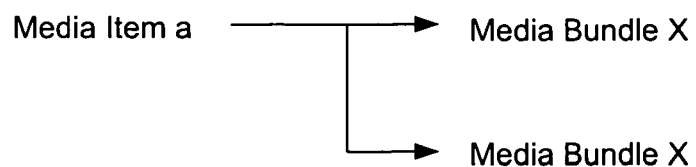
FIG. 18B is a diagram illustrating a relationship between a particular media item and one or media bundles according to one embodiment of the invention.

FIG. 18B is a diagram illustrating a relationship between a particular media item and one or media bundles according to one embodiment of the invention. As shown in FIG. 18B, Media Item a corresponds to Media Bundle X and Media Bundle Y because both such media bundles include the Media Item a or its equivalent.

Figure 18C:
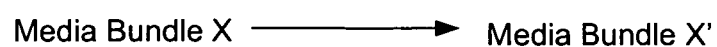
FIG. 18C is a diagram illustrating a pair of related media bundles according to one embodiment of the invention.

FIG. 18C is a diagram illustrating a pair of related media bundles according to one embodiment of the invention. As shown in FIG. 18C, Media Bundle X is related to Media Bundle X'. For example, Media Bundle X' might pertain to a resubmission of Media Bundle X.

Still further, once related media bundles have been identified, additional processing can be automatically performed to match the various media items within the respective media bundles. By matching the media items, the correspondence between the media items with the related media bundles can be known on a media item level. Matching media items are deemed equivalent media items. In one embodiment, matching information (or matching data) which results from the matching can be considered part of the media bundle data 1806. Thereafter, the matching information can be used to control visual features of a graphical user interface concerning an upgrade opportunity or control which media assets of a media bundle are not redelivered to the user because the user already has previously acquired one or more but not all of the media assets of the media bundle.

Figure 18D:
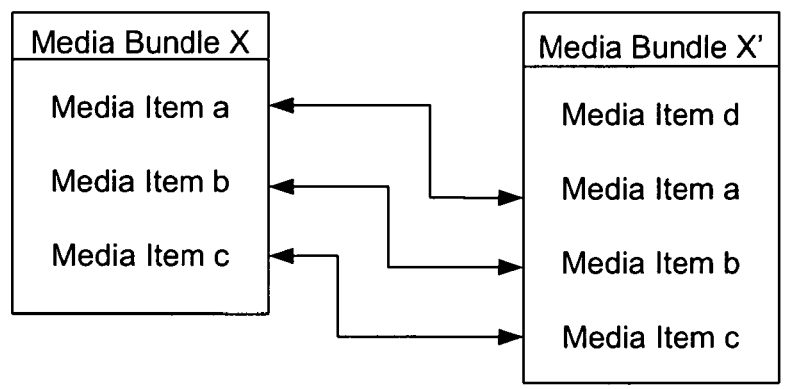
FIG. 18D illustrates matching data between corresponding media bundles according to one embodiment of the invention.

FIG. 18D illustrates matching data between corresponding media bundles according to one embodiment of the invention. In FIG. 18D, a Media Bundle X including media items a, b and c., and a Media Bundle X' including media items a, b, c and d. As an example, these media items can pertain to songs, videos, podcasts or TV shows. The Media Bundle X' and the Media Bundle X are deemed related. Match processing can be performed between these related media bundles to yield matching information. The arrows between the Media Bundle X' and the Media Bundle X operate to match (or link) the media items between the media bundles. For example, media item a of Media Bundle X is at track 1 but this same or equivalent media item is at track 2 of Media Bundle X'.

According to one embodiment, matching process in the case where the media items are songs can be as follows in a hierarchical sense where only one test need be satisfied. A first match test can look for media items in the corresponding media bundles that have a matching ISRC. A second match test can look for media items in the corresponding media bundles that have a matching vendor identifier (VendorID) and content provider (name). If there is more than one matching media item (because neither the first match test or the second match test is distinctive to a single media item in the media bundle), then a third match test can look for media items in the corresponding media bundles that have a matching ISRC as well as matching track and disc number. If there is more than one matching media item (because neither the first match test or the second match test is distinctive to a single media item in the media bundle), then a third match test can look for media items in the corresponding media bundles that have a matching ISRC as well as matching track and disc number. If the third match test is not distinctive to a single media item in the media bundle, then a fourth match can look for media items in the corresponding media bundles that have a matching vendor identifier, content provider, track number and disk number. A fifth match test can look for media items in the corresponding media bundles that have matching name, track number and disc number. A sixth match test can look for media items in the corresponding media bundles that have matching name, artist and duration. The matching process in the case where the media items are other than songs can operate similarly.

Figure 19:
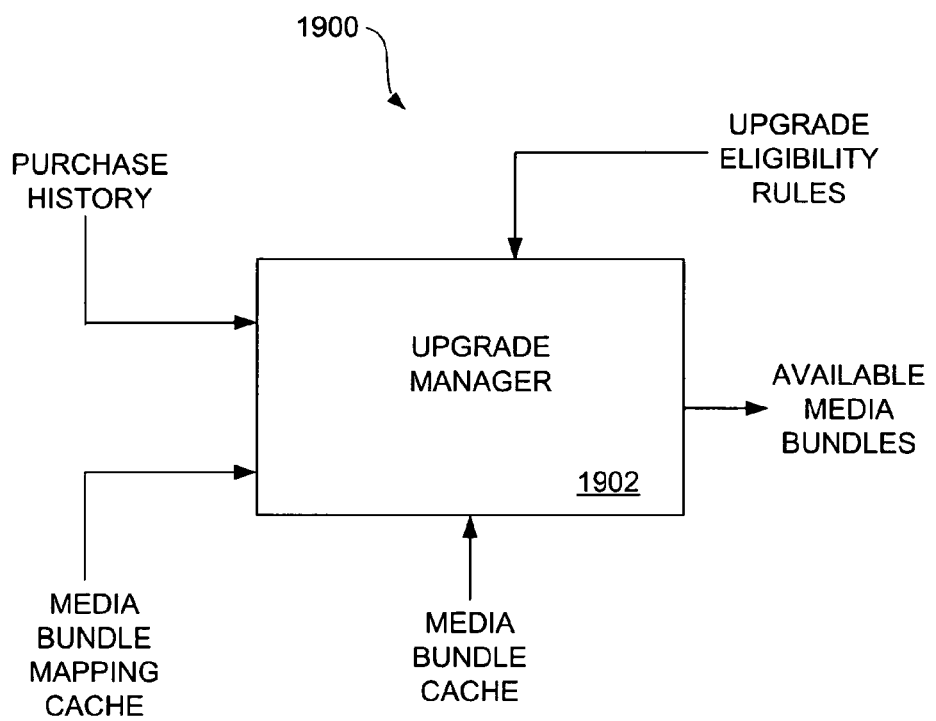
FIG. 19 is a block diagram of an upgrade system according to one embodiment of the invention.

FIG. 19 is a block diagram of an upgrade system 1900 according to one embodiment of the invention. The upgrade system 1900 can provide upgrade processing. The upgrade system 1900 includes an upgrade manager 1902. The upgrade manager 1902 receives various input data that is processed to determine available media bundles. In one embodiment, the available media bundles are those media bundles that are available for completion (upgrade). The input data to the upgrade manager 1902 can, for example, include purchase history, media bundle mapping cache, media bundle cache, and upgrade eligibility rules. The purchase history can include data on prior purchases made by a particular user. The media bundle mapping cache can include mappings from media items (and their equivalents) to media bundles. As an example, the media bundle mapping cache can be the media item to media bundle mapping cache 1810 illustrated in FIG. 18. The media bundle cache can include information on media bundles. As an example, the media bundle cache can be the media bundle cache 1808 illustrated in FIG. 18.

The upgrade eligibility rules can include one or more rules (e.g., business rules or policies) that are used in determined those media items and/or media bundles that are eligible for completion/upgrade. For example, one such upgrade eligibility rule that might be used is that upgrade to a complete media bundle is permitted only within 180 days of purchase of a first media item within the media bundle.

As another example, an upgrade eligibility rules might be that media items previously can be eligible for upgrade to an associated media bundle in a given time period. For example, a special promotional period (e.g., during a particular day or month) can be enabled during which previously purchased media items can be upgraded regardless of how long ago the media items were purchased.

As another example, an upgrade eligibility rules might be that media items acquired without charge are not eligible for upgrade to an associated media bundle. As another example, an upgrade eligibility rules might be that pre-release media items (i.e., a media item (e.g., audio track) acquired before release of the associated media bundle (e.g., album) is eligible for upgrade to a subsequently release media album.

As still another example, eligibility of media items can depend on from which on-line store that media items where purchased. For example, different geographic areas (e.g., countries) can have different on-line media stores. Hence, buying a media items in one on-line media store can permit upgrade to an associated media bundle only in that same on-line media store.

As still another example, media items that are acquired through a gift certificate or as a gift using an on-line media store can be eligible for upgrade.

As yet another example, pricing can impact eligibility of a media bundle for upgrade. For example, in one embodiment, a minimum price (minimum cost) for upgrading to an associated media bundle can be imposed. If the price of the upgrade (which depends on the number of media items already purchased from the media bundle by a user) is less that a minimum price, then the associated media bundle is not eligible for upgrade by the user.

Figure 20:
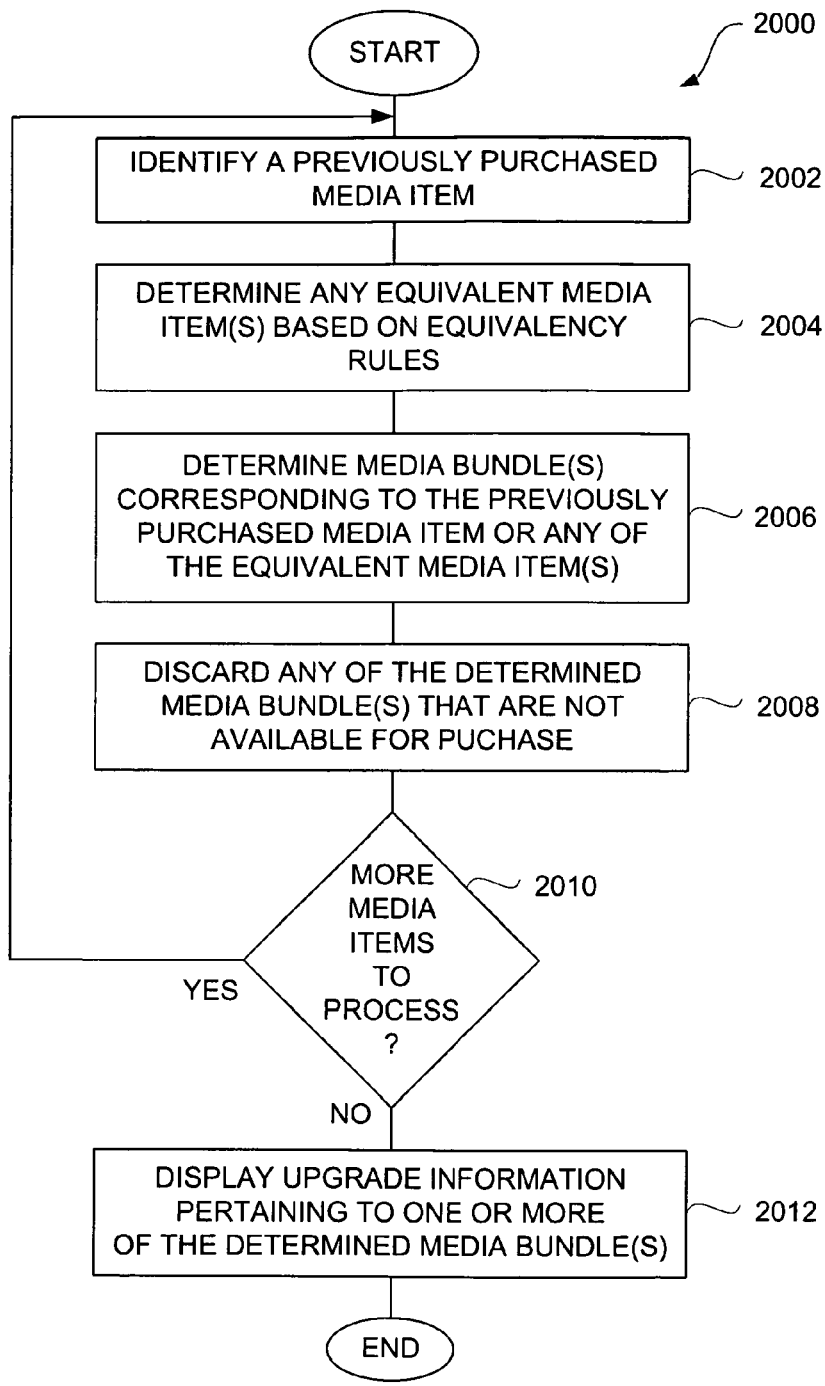
FIG. 20 is a flow diagram of a upgrade availability process according to one embodiment of the invention.

FIG. 20 is a flow diagram of a upgrade availability process 2000 according to one embodiment of the invention. The upgrade availability process 2000 is, for example, performed by an upgrade manager and/or equivalency manager.

The upgrade availability process 2000 identifies 2002 a previously purchased media item. For example, the purchase history associated with a particular user can be examined to identify 2002 a previously purchased media item. Any equivalent media items that might be available can then determined 2004 based on equivalency rules. The equivalency rules, for example, are rules that can be used to determine whether one media item is deemed an "equivalent" of another media item. Next, one or media bundles that correspond to the previously purchased media item or any of the equivalent media item(s) can be determined 2006. In some cases, not all of the media bundles that have been determined 2006 are available for purchase. For example, the owner or distributor of the media bundle may preclude purchase of a media bundle as an upgrade. As another example, an on-line media store may no longer support or permit sale of a media bundle. As still another example, an on-line media store may not permit sale of media bundles in certain situations, such as when the upgrade price being less than a minimum cost. Hence, the upgrade availability process 2000 can discard 2008 any of the determined media bundles that are not available for purchase. In one embodiment, eligibility rules can be used in this regard.

Next, a decision 2010 can determine whether more previously purchased media items are to be processed. When the decision 2010 determines that there are more media items to process, then the upgrade availability process 2000 returns to repeat block 2002 and subsequent so that additional available media bundles can be determined. Once the decision 2010 determines that there are no more media items to process, upgrade information pertaining to one or more of the determined media bundles can be displayed 2012. Following the display 2012 of the one or more determined media bundles, the upgrade availability process 2000 can end.

Equivalency rules can be used to link together media items in various different scenarios. Media items that are re-released by the same or different label can be considered equivalent. Media items that are pre-released can be considered equivalent to the same subsequently released media items. Radio versions (e.g., radio edits) might be considered equivalent to a non-radio version of the same media item.

In another embodiment, a user can be informed of media bundles that are available for upgrade when initiating a purchase for a media item. For example, if the user initiates a purchase for a media item, the system can determine whether the associated media bundle is available for upgrade by the user. In the case that the associated media bundle is available for upgrade, the user can be notified, such as before the purchase of the media item is completed. In one embodiment, the user can be notified by a dialog window (e.g., pop-up window) that is presented on a display device of a client machine. Alternatively, in the case that the associated media bundle is no longer available from the system, the user can instead be notified of other media bundles that are related to or equivalent to the associated media bundle.

In another embodiment, media bundles that are available for upgrade can be displayed in a graphical user interface using media item representations for the media bundles that can be scrolled using a transition control. Additional details on such a graphical user interface using media item representations that can be scrolled are provided in U.S. application Ser. No. 11/061,321, filed Feb. 17, 2005, and entitled "GRAPHICAL USER INTERFACE FOR BROWSING, SEARCHING AND PRESENTING MEDIA ITEMS," which is hereby incorporated herein by reference.

Figure 21:
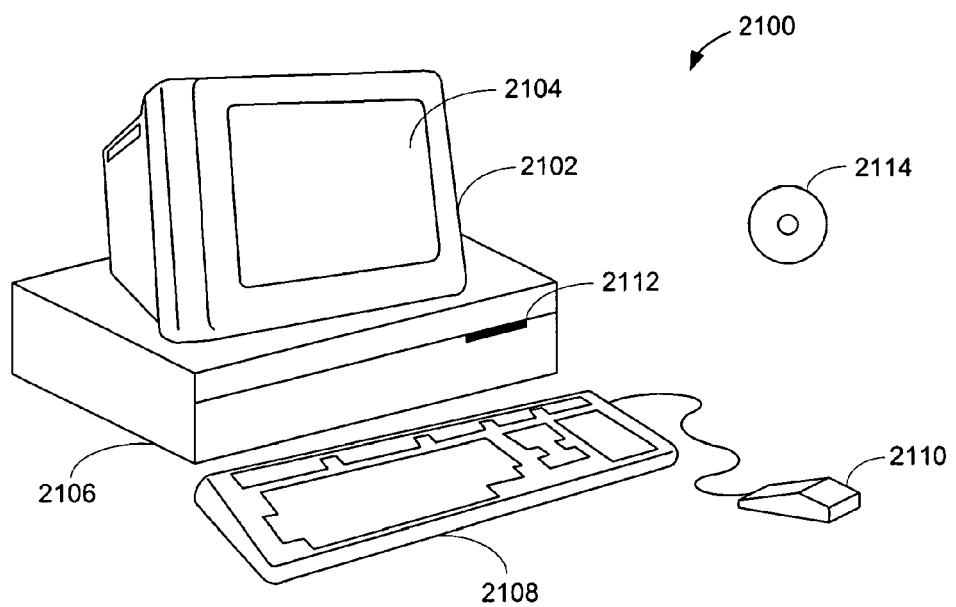
FIG. 21 shows an exemplary computer system suitable for use with the invention.

FIG. 21 shows an exemplary computer system 2100 suitable for use with the invention. Although the client device need not be a personal computer, the client device can be the exemplary computer system 2100 illustrated in FIG. 21. The computer system 2100 includes a display monitor 2102 having a single or multi-screen display 2104 (or multiple displays), a cabinet 2106, a keyboard 2108, and a mouse 2110. The cabinet 2106 houses a processing unit (or processor), system memory and a hard drive (not shown). The cabinet 2106 also houses a drive 2112, such as a CD-ROM or floppy drive. The drive 2112 can also be a removable hard drive, a Flash or EEPROM device, etc. Regardless, the drive 2112 may be utilized to store and retrieve software programs incorporating computer code that implements some or all aspects of the invention, data for use with the invention, and the like. Although CD-ROM 2114 is shown as an exemplary computer readable storage medium, other computer readable storage media including floppy disk, tape, Flash or EEPROM memory, memory card, system memory, and hard drive may be utilized. Additionally, a data signal embodied in a carrier wave (e.g., in a network) may be the computer readable storage medium. In one implementation, a software program for the computer system 2100 is provided in the system memory, the hard drive, the CD-ROM 2114 or other computer readable storage medium and serves to incorporate the computer code that implements some or all aspects of the invention.

The digital media assets (i.e., digital media items) can pertain to video items (e.g., video files or movies), audio items (e.g., audio files or audio tracks, such as for songs (music) or audiobooks), or image items (e.g., photos). The digital media assets can also include or be supplemented by text or multimedia files.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that sets (e.g., groups or collections) of digital media assets can be supported by an on-line media store. Another advantage of the invention is that a set of digital media assets can be purchased in a cost effective manner even though the purchaser has previously purchased one of the digital media assets of the set. Another advantage of the invention is that users can be notified in a computer automated manner of available upgrades that can be purchased. Another advantage of the invention is that a graphical user interface can present to users upgrade opportunities and provide information about specific available upgrades. Still another advantage of the invention is that through intelligent processing other sets of digital media assets can be identified and made available as upgrades even though such sets are not the exact sets from which a digital media asset was previously purchased.

The following items are hereby incorporated herein by reference: (i) U.S. patent application Ser. No. 11/247,948, filed Oct. 10, 2005, and entitled "ON-LINE MEDIA STORE THAT SUPPORTS PRE-ORDERING OF DIGITAL MEDIA ASSETS;" (ii) U.S. patent application Ser. No. 11/212,314, filed Aug. 24, 2005, and entitled "ON-LINE MEDIA STORE THAT SUPPORTS PRE-ORDERING OF DIGITAL MEDIA ASSETS;" (iii) U.S. patent application Ser. No. 10/833,267, filed Apr. 26, 2004, and entitled "METHOD AND SYSTEM FOR NETWORK-BASED PURCHASE AND DISTRIBUTION OF MEDIA;" and (iv) U.S. patent application Ser. No. 10/687,534, filed Oct. 15, 2003, and entitled "METHOD AND SYSTEM FOR SUBMITTING MEDIA FOR NETWORK-BASED PURCHASE AND DISTRIBUTION."

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
   identifying, by a processor, a first media asset purchased by a user associated with a device;
   determining, by the processor, that the first media asset is an interchangeable variation of a second media asset in a media asset bundle available for purchase as a collection from a server;
   calculating, by the processor, an upgrade cost for the media asset bundle by reducing a reduced bundle price defined for the collection by a respective cost of the second media asset in the media asset bundle, wherein the reduced bundle price defined for the collection is different than a combined cost of all individual media items in the media asset bundle; and
   generating, by the processor, a media item listing area providing a listing of media items in the media asset bundle, wherein the media item listing identifies the first media asset or the second media asset as being previously acquired and a remaining set of media assets in the media item listing as being available from the server as part of the media asset bundle at the upgrade cost.

2. The method of claim 1, wherein determining that the first media asset is an interchangeable variation of the second media asset comprises determining that the first media asset is equivalent to the second media asset based on at least one of a matching vendor identifier, a matching disk number, or a matching media asset code.

3. The method of claim 1, wherein the media asset bundle is an album, and items in the listing of media items are tracks, and wherein the listing of media items displays at least one of a name, duration, artist or album.

4. The method of claim 1, wherein the listing of media items further includes an indication of a respective cost for each of the remaining set of media assets.

5. The method of claim 1, wherein the listing of media items identifies a number of media items in the remaining set of media assets.

6. The method of claim 1, further comprising identifying an opportunity to upgrade the first media asset to the collection associated with the media asset bundle based on the determining that the first media asset is an interchangeable variation of the second media asset in the media asset bundle available for purchase as the collection from the server.

7. The method of claim 6, wherein generating the media item listing is triggered by the identifying of the opportunity to upgrade.

8. The method of claim 6, wherein determining that the media asset is an interchangeable variation of the second media asset comprises determining that the first media asset is equivalent to the second media asset, wherein determining that the first media asset is equivalent to the second media asset comprises identifying the first media asset as being equivalent to the second media asset by matching the first media asset to the second media asset in a listing of equivalency mappings.

9. The method of claim 6, further comprising identifying a second opportunity to upgrade the first media asset purchased by the user to a second collection associated with a different media asset bundle based on a determination that the first media asset is a second interchangeable variation of a third media asset in the different media asset bundle, the different media asset bundle being available for purchase as the second collection from the server.

10. The method of claim 1, further comprising presenting, via a graphical user interface, at least one upgrade request control to enable the user to request an upgrade to complete the media asset bundle.

11. A non-transitory computer-readable storage medium comprising:
    instructions stored on the non-transitory computer-readable storage medium which, when executed by at least one processor, cause the at least one processor to:
    identify a first media asset purchased by a user associated with a device;
    determine that the first media asset is an interchangeable variation of a second media asset in a media asset bundle available for purchase as a collection from a server;
    calculate an upgrade cost for the media asset bundle by reducing a reduced bundle price defined for the collection, by a respective cost of the second media asset in the media asset bundle, wherein the reduced bundle price defined for the collection is different than a combined cost of individual all media items in the media asset bundle; and
    generate a media item listing area providing a listing of media items in the media asset bundle, wherein the media item listing identifies first media asset or the second the media asset as being previously acquired and a remaining set of media assets in the media item listing as being available from the server as part of the media asset bundle at the upgrade cost.

12. The non-transitory computer-readable storage medium of claim 11, wherein determining that the first media asset is an interchangeable variation of the second media asset comprises determining that the first media asset is equivalent to the second media asset based on at least one of a matching vendor identifier, a matching disk number, or a matching media asset code.

13. The non-transitory computer-readable storage medium of claim 11, wherein the media asset bundle is an album, and items in the listing of media items are tracks, and wherein the listing of media items displays at least one of a name, duration, artist or album, and wherein the listing of media items further includes an indication of a respective cost for each of the remaining set of media assets.

14. The non-transitory computer-readable storage medium of claim 11, storing additional instructions which, when executed by the at least one processor, cause the at least one processor to identify an opportunity to upgrade the first media asset purchased by the user to the collection associated with the media asset bundle based on the determining that the media asset is the interchangeable variation of the second media asset in the media asset bundle available for purchase as the collection from the server.

15. The non-transitory computer-readable storage medium of claim 14, wherein determining that the media asset is an interchangeable variation of the second media asset comprises determining that the first media asset is equivalent to the second media asset, wherein determining that the first media asset is equivalent to the second media asset in the media asset bundle available for purchase as the collection from the server comprises identifying the first media asset as being equivalent to the second by matching the first media asset to the second media asset in a listing of equivalency mappings, wherein the listing of equivalency mappings is generated based on equivalency rules.

16. A system comprising:
at least one processor; and
at least one computer-readable storage medium having stored therein instructions which, when executed by the at least one processor, cause the at least one processor to perform operations comprising:
- identifying a first media asset purchased by a user associated with a device;
- determining that the first media asset is an interchangeable variation of a second media asset in a media asset bundle available for purchase as a collection from a server;
- calculating an upgrade cost for the media asset bundle by reducing a reduced bundle price defined for the collection, by a respective cost of the second media asset in the media asset bundle, wherein the reduced bundle price defined for the collection is different than a combined cost of all individual media items in the media asset bundle; and
- generating a media item listing area providing a listing of media items in the media asset bundle, wherein the media item listing identifies first media asset or the second the media asset as being previously acquired and a remaining set of media assets in the media item listing as being available from the server as part of the media asset bundle.

17. The system of claim 16, wherein determining that the first media asset is an interchangeable variation of the second media asset comprises determining that the first media asset is equivalent to the second media asset based on at least one of a matching vendor identifier, a matching disk number, or a matching media asset code.

18. The system of claim 16, the at least one computer-readable storage medium storing additional instructions which, when executed by the at least one processor, cause the at least one processor to perform an operation comprising: identifying an opportunity to upgrade the first media asset purchased by the user to the collection associated with the media asset bundle based on the determining that the first media asset is the interchangeable variation of the second media asset in the media asset bundle available for purchase as the collection from the server.

19. The system of claim 18, wherein determining that the media asset is an interchangeable variation of the second media asset comprises determining that the first media asset is equivalent to the second media asset, wherein determining that the first media asset is equivalent to the second media asset comprises identifying the first media asset as being equivalent to the second media asset by matching the first media asset to the second media asset in a listing of equivalency mappings.

20. The system of claim 18, the at least one computer-readable storage medium storing additional instructions which, when executed by the at least one processor, cause the at least one processor to perform an operation comprising: identifying a second opportunity to upgrade the first media asset purchased by the user to a different collection associated with a different media asset bundle based on a determination that the first media asset is equivalent to a third media asset in the different media asset bundle, the different media asset bundle being available for purchase as a second collection from the server.

* * * * *